United States Patent
Kögler et al.

(10) Patent No.: US 9,500,496 B2
(45) Date of Patent: Nov. 22, 2016

(54) APPARATUS, METHOD AND COMPUTER PROGRAM FOR SPATIALLY REPRESENTING A DIGITAL MAP SECTION

(71) Applicant: VOLKSWAGEN AKTIENGESELLSCHAFT, Wolfsburg (DE)

(72) Inventors: Indra-Lena Kögler, Berlin (DE); Benjamin Gross, Braunschweig (DE); Markus Hübner, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 14/439,902

(22) PCT Filed: Jul. 24, 2013

(86) PCT No.: PCT/EP2013/065654
§ 371 (c)(1),
(2) Date: Apr. 30, 2015

(87) PCT Pub. No.: WO2014/067677
PCT Pub. Date: May 8, 2014

(65) Prior Publication Data
US 2015/0285654 A1    Oct. 8, 2015

(30) Foreign Application Priority Data

Oct. 30, 2012  (DE) .......... 10 2012 021 193
Nov. 30, 2012  (DE) .......... 10 2012 023 481

(51) Int. Cl.
*G01C 21/00*    (2006.01)
*G01C 21/26*    (2006.01)
*G01C 21/34*    (2006.01)
(Continued)

(52) U.S. Cl.
CPC ......... *G01C 21/367* (2013.01); *G01C 21/3635* (2013.01); *G09B 29/106* (2013.01)

(58) Field of Classification Search
CPC combination set(s) only.
See application file for complete search history.

(56) References Cited

U.S. PATENT DOCUMENTS 6,175,802 B1    1/2001    Okude et al.
6,448,969 B1 *  9/2002    Minakawa .......... G01C 21/3635
                                                       345/421
(Continued)

FOREIGN PATENT DOCUMENTS

DE    69026288 T2    10/1996
DE    19801801 A1    7/1998
(Continued)

OTHER PUBLICATIONS

Search Report for German Patent Application No. 10 2012 023 481.3; Apr. 9, 2013.
(Continued)

*Primary Examiner* — Yonel Beaulieu
(74) *Attorney, Agent, or Firm* — Barnes & Thornburg LLP

(57) ABSTRACT

A navigation apparatus for spatially representing a digital map section around a geographical position on the earth's surface on the basis of digital geodata, wherein the digital geodata have height information, having a first input interface for the digital geodata; a second input interface for coordinates of the geographical position; a third input interface for a perspective stipulation variable corresponding to a desired viewing direction of the position; a processor module which is coupled to the first, second and third input interfaces; and an output interface coupled to the processor module and intended to output output data corresponding to the projection of the geodata which can be visually perceived in different ways and corresponds to the height information.

23 Claims, 16 Drawing Sheets

(51) Int. Cl.
*G01C 21/36* (2006.01)
*G09B 29/10* (2006.01)

(56) References Cited

U.S. PATENT DOCUMENTS

2008/0086265 A1  4/2008  Heuser
2011/0054778 A1* 3/2011  Poiesz ............... G01C 21/3635
                                                  701/533

FOREIGN PATENT DOCUMENTS

| DE | 19980510 T1 | 7/2000 |
| DE | 69730262 T2 | 9/2005 |
| DE | 69835122 T2 | 12/2006 |
| EP | 1914516 A2 | 4/2008 |
| JP | 10333560 A | 12/1998 |
| JP | 2011237836 A | 11/2011 |

OTHER PUBLICATIONS

Search Report for International Patent Application No. PCT/EP2013/065654; Oct. 28, 2013.
Office Action for German Patent Application No. 10 2012 023 481.3; Jul. 23, 2015.

* cited by examiner

| imperial | UK | angle [°] | metric | | angle [°] |
|---|---|---|---|---|---|
| | | Scale MIB High | | | |
| 30 | yd | 34 | 30 | m | 34 |
| 50 | yd | 34 | 50 | m | 34 |
| 75 | yd | 34 | 75 | m | 34 |
| 100 | yd | 34 | 100 | m | 34 |
| 150 | yd | 34 | 150 | m | 34 |
| 200 | yd | 34 | 200 | m | 34 |
| 300 | yd | 34 | 300 | m | 34 |
| 400 | yd | 34 | 400 | m | 34 |
| 500 | yd | 34 | 500 | m | 34 |
| 750 | yd | 34 | 750 | m | 34 |
| 0.7 | mi | 34 | 1 | km | 34 |
| 1 | mi | 34 | 1.5 | km | 34 |
| 1.5 | mi | 34 | 2 | km | 34 |
| 2 | mi | 34 | 3 | km | 34 |
| 2.5 | mi | 34 | 4 | km | 34 |
| 3 | mi | 34 | 5 | km | 34 |
| 4 | mi | 35 | 6 | km | 36 |
| 5 | mi | 36 | 8 | km | 36 |
| 7 | mi | 37 | 10 | km | 37 |
| 10 | mi | 38 | 15 | km | 38 |
| 15 | mi | 39 | 20 | km | 39 |
| 20 | mi | 39 | 30 | km | 39 |
| 25 | mi | 42 | 40 | km | 42 |
| 30 | mi | 45 | 50 | km | 45 |
| 40 | mi | 48 | 60 | km | 48 |
| 50 | mi | 54 | 80 | km | 54 |
| 70 | mi | 60 | 100 | km | 60 |
| 80 | mi | 63 | 125 | km | 63 |
| 100 | mi | 66 | 150 | km | 66 |
| 125 | mi | 72 | 175 | km | 69 |
| 150 | mi | 72 | 200 | km | 72 |
| 200 | mi | 78 | 300 | km | 78 |
| 250 | mi | 81 | 400 | km | 81 |
| 300 | mi | 84 | 500 | km | 84 |
| 400 | mi | 87 | 600 | km | 87 |
| 600 | mi | 90 | 1000 | km | 90 |
| 1000 | mi | 90 | 1500 | km | 90 |
| 1250 | mi | 90 | 2000 | km | 90 |
| 1500 | mi | 90 | 2500 | km | 90 |

FIG. 6

Scale MIB High

| imperial UK | | far plane scale factor | sky offset | metric | | far plane scale factor | sky offset |
|---|---|---|---|---|---|---|---|
| 30 | yd | 1.5 | 50 | 30 | m | 1.5 | 50 |
| 50 | yd | 1.5 | -50 | 50 | m | 1.5 | -50 |
| 75 | yd | 1.5 | 50 | 75 | m | 1.5 | 50 |
| 100 | yd | 1.5 | -50 | 100 | m | 1.5 | -50 |
| 150 | yd | 1.5 | -50 | 150 | m | 1.5 | -50 |
| 20 | yd | 1.5 | -50 | 200 | m | 1.5 | -50 |
| 30 | yd | 1.5 | -50 | 300 | m | 1.5 | -50 |
| 400 | yd | 1.5 | -50 | 400 | m | 1.5 | -50 |
| 500 | yd | 1.5 | -50 | 500 | m | 1.5 | -50 |
| 750 | yd | 0.98 | -40 | 750 | m | 0.98 | -40 |
| 0.7 | mi | 0.95 | -50 | 1 | km | 0.95 | -50 |
| 1 | mi | 0.95 | -50 | 1.5 | km | 0.95 | -50 |
| 1.5 | mi | 0.95 | -50 | 2 | km | 0.95 | -50 |
| 2 | mi | 0.95 | -50 | 3 | km | 0.95 | -50 |
| 2.5 | mi | 0.95 | -50 | 4 | km | 0.95 | -50 |
| 3 | mi | 0.95 | -50 | 5 | km | 0.95 | -50 |
| 4 | mi | 0.95 | -50 | 6 | km | 0.95 | -50 |
| 5 | mi | 0.95 | -50 | 8 | km | 0.95 | -50 |
| 7 | mi | 0.94 | -70 | 10 | km | 0.94 | -65 |
| 10 | mi | 0.94 | -70 | 15 | km | 0.94 | -70 |
| 15 | mi | 0.94 | -70 | 20 | km | 0.94 | -70 |
| 20 | mi | 0.94 | -66 | 30 | km | 0.94 | -66 |
| 25 | mi | 0.93 | -70 | 40 | km | 0.93 | -70 |
| 30 | mi | 1.2 | -22 | 50 | km | 1.2 | -22 |
| 40 | mi | 1 | 0 | 60 | km | 1 | 0 |
| 50 | mi | 1 | 0 | 8 | km | 1 | 0 |
| 70 | mi | 1 | 0 | 100 | km | 1 | 0 |
| 80 | mi | 1 | 0 | 125 | km | 1 | 0 |
| 100 | mi | 1 | 0 | 150 | km | 1 | 0 |
| 125 | mi | 1 | 0 | 175 | km | 1 | 0 |
| 150 | mi | 1 | 0 | 200 | km | 1 | 0 |
| 200 | mi | 1 | 0 | 300 | km | 1 | 0 |
| 250 | mi | 1 | 0 | 400 | km | 1 | 0 |
| 300 | mi | 1 | 0 | 500 | km | 1 | 0 |
| 400 | mi | 1 | 0 | 600 | km | 1 | 0 |
| 600 | mi | 1 | 0 | 1000 | km | 1 | 0 |
| 1000 | mi | 1 | 0 | 1500 | km | 1 | 0 |
| 1250 | mi | 1 | 0 | 2000 | km | 1 | 0 |
| 1500 | mi | 1 | 0 | 2500 | km | 1 | 0 |

FIG. 10

One-way street begins here

One-way street turns left

US 9,500,496 B2

APPARATUS, METHOD AND COMPUTER PROGRAM FOR SPATIALLY REPRESENTING A DIGITAL MAP SECTION

PRIORITY CLAIM

This patent application is a U.S. National Phase of International Patent Application No. PCT/EP2013/065654, filed 24 Jul. 2013, which claims priority to German Patent Application Nos. 10 2012 021 193.7, filed 30 Oct. 2012, and 10 2012 023 481.3, filed 30 Nov. 2012, the disclosures of which are incorporated herein by reference in their entirety.

SUMMARY

Illustrative embodiments relate to a navigation apparatus for the spatial representation of a digital map detail around a geographical position on the earth's surface on the basis of digital geodata, wherein the digital geodata have height information.

BACKGROUND

Navigation apparatuses for displaying journey or flight routes are known. Such navigation apparatuses generally comprise a display apparatus that can be used to represent a detail from a map or road map on the basis of digital geodata, or topographical data. Usually, the display essentially shows the course of the roads and paths within the presented map detail and also features of the surroundings, such as outlines of adjoining buildings, localities or wooded areas. Conventionally, three-dimensional geodata can be represented in two dimensions using navigation systems, but known representations of this kind do not give the impression of spatial plasticity.

There is, therefore, a need to provide a navigation apparatus having an improved display that provides the user with a fully-fledged spatially realistic perception of the displayed map section.

BRIEF DESCRIPTION OF THE DRAWINGS

Exemplary embodiments are explained in more detail below with reference to the appended figures.

FIG. 4a shows a plastic representation of a 2½D map section for a day representation with color gradations corresponding to the lookup table from FIG. 3a;

FIG. 6 shows a lookup table that stores viewing angles that correspond to different height values for parameterizing a viewing direction;

FIG. 10 shows a lookup table for parameterizing horizon settings;

DETAILED DESCRIPTION OF THE DISCLOSED EMBODIMENTS

Figure 1:
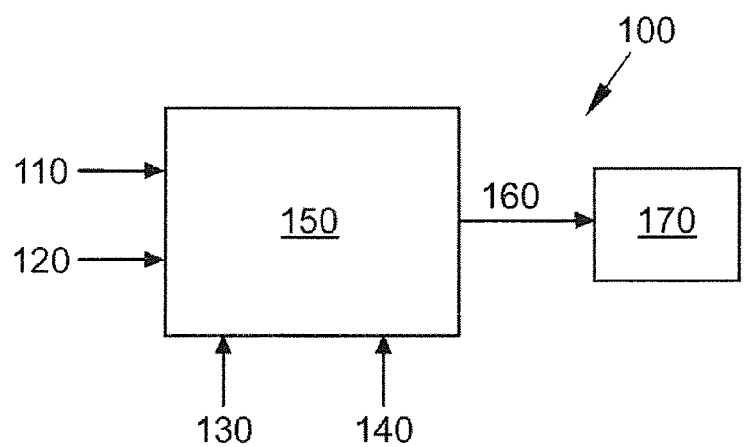
FIG. 1 shows a schematic illustration of a navigation apparatus for the spatial representation of a digital map detail according to at least one exemplary embodiment.

According to at least one disclosed embodiment, a navigation apparatus for the spatial representation of a digital map detail around a geographical position on the earth's surface on the basis of digital geodata is provided. In this case, the digital geodata or topographical data have not only two-dimensional coordinates or position statements but additionally also height information. According to exemplary embodiments, the navigation apparatus comprises a first input interface for the digital geodata, a second input interface for coordinates or position statements for the geographical position and a third input interface for a perspective stipulation variable that corresponds to a desired viewing direction to the position. In addition, the navigation apparatus comprises a processor module that is coupled to the first, second and third input interfaces. In this case, the processor module is set up or customized, on the basis of the perspective stipulation variable and the geographical position, to ascertain or compute a coordinate transformation of the geodata that corresponds to the desired viewing direction. In addition, the processor module is set up or customized to associate different visual perception values with the geodata for different topological height values to obtain a visually differently perceptible or notionally plastic projection of the geodata that corresponds to the height information. In addition, the navigation apparatus comprises an output interface, coupled to the processor module, for outputting output data that correspond to the visually differently perceptible projection of the geodata that corresponds to the height information.

In other words, the processor module may be designed, for example by means of suitable programming and/or electrical connection, to take the input data obtained via the first, second and third input interfaces as a basis for altering or complementing the digital geodata such that spatial plasticity that is perceptible to a viewer of a display is obtained for an electronic navigation map that is based on the output data.

According to exemplary embodiments, the first input interface may be implemented, for example, as an access device for accessing an electronic storage medium, particularly a CD-ROM, DVD-ROM or hard disk memory that stores the digital geodata. The second input interface can be used to read in the coordinates of the geographical position of interest. In this case, the geographical position relates to a current position of a vehicle in which the navigation apparatus may be embedded, for example. In this case, the geographical position as a current vehicle position can be ascertained by means of a GPS device (GPS=Global Positioning System), for example, and transferred to the processor module via the second input interface. The geographical position may alternatively be a desired destination position specified by the user. The third input interface can be used by the user to input a desired viewing direction or a desired virtual viewing height, that is to say to stipulate a perspective from which the user wishes to view the geographical position on the electronic or digital map. It is thus possible for the user to stipulate that he wishes to view roads and the surroundings thereof from a desired virtual height, for example, 100 m above the vehicle. On the basis of the stipulated perspective and the geographical position, the processor module ascertains a coordinate transformation or projection for the digital geodata that corresponds to the desired viewing direction. In this case, the digital geodata can be converted into a notionally perspective 2D or 3D view—depending on the format of the original digital geodata—by the processor module using image reproduction techniques through scaling, rotation and displacement. In addition, the processor module associates different visual perception values for different topological height values with the geodata transformed or projected on the basis of the stipulated perspective. In this way, the output data that code a visually differently perceptible projection of the geodata that corresponds to the height information are obtained. The output data obtained in this manner can be output by an output interface to a display apparatus for displaying the edited geodata in a notionally plastic map.

The cited navigation apparatus for the spatial representation of a digital map detail can be used to provide a user with a plastic representation of the roads and buildings surrounding him and of the terrain relief surrounding him on a display apparatus, particularly on a navigation display, as a result of which the user is able to assess his surroundings in an improved manner. Such a representation is useful particularly with a vehicle that is traveling at high speed or when visual conditions are poor.

According to some exemplary embodiments, a navigation apparatus for the spatial representation of a digital map detail can involve the digital geodata having two-dimensional geodata plus associated height values. These may be what are known as 2½D or 2.5D data, for which every point in the represented map section has a height stated in addition to two-dimensional x and y or length and width coordinates. The 2.5D representation is particularly suitable for providing a perspective or plastic virtual-3D map representation of the map detail. However, vertical walls and overhangs cannot be modeled in this way. In the case of 2½D geodata, the processor module may be set up or customized, on the basis of the perspective stipulation variable, that is to say the virtual height statement, for example, and the geographical position, to ascertain a two-dimensional coordinate transformation or projection for the two-dimensional geodata that corresponds to the desired viewing direction, and to associate different visual perception values to the two-dimensional geodata for different topographical height values, which perception values result in the plastic viewing effect despite a representation of the transformed geodata that is still two-dimensional.

According to some exemplary embodiments, the digital geodata can also be present in genuinely three-dimensional form, i.e. with three-dimensional x, y and z coordinates. In such cases, the navigation apparatus may additionally also have a fourth input interface for at least one light source stipulation variable that corresponds to a desired virtual light source. In such cases, the processor module may be set up or customized, on the basis of the perspective stipulation variable and the geographical position, to ascertain a three-dimensional coordinate transformation or projection of the geodata that corresponds to the desired viewing direction. In addition, the processor module may be set up or customized to associate different visual perception values with the three-dimensional geodata for different topographical or topological height values and to associate different light and shade regions with the resultant three-dimensional projection of the geodata on the basis of the light source stipulation variable.

The fourth input interface of the navigation apparatus can be used to read in input data that model a virtual light source. In this case, these input data are represented as a light source stipulation variable, for example, a vector. The light source stipulation variable can comprise statements about the height, the angle and/or the direction of the light source relative to the geographical position. A combination of the variables obtained via the four input interfaces, particularly the height information, the perspective stipulation variable, predetermined visual perception values for the plasticity and the light source stipulation variable, allows a fully-fledged spatially realistic perception to be produced for the user.

Optionally, a navigation apparatus for the spatial representation of a digital map detail according to one exemplary embodiment can have the processor module designed or set up to provide, for a viewing direction that corresponds to an observation point behind and above the geographical position, a virtual horizon region in a region of the digital map detail that becomes free as a result of the coordinate transformation or the perspective tilt of the original geodata in a display region of the geodata. This is intended to be understood to mean a display region that is obtained as a result of tilting or rotation, corresponding to the coordinate transformation, of the original geodata from a pure plan view. A pure plan view, particularly of two-dimensional geodata, does not allow a notionally plastic representation. According to exemplary embodiments, the geodata are therefore tilted or rotated, e.g. by a central projection. The tilting then results in a freed image region that is no longer required for displaying the tilted data. This image region can therefore be provided with a horizon region, for example by means of corresponding coloring, to enhance the plastic impression. By providing a horizon region in the digital map detail, it is possible to achieve a natural and realistic representation of the horizon that conveys a visual appearance of a curvature of the earth.

To produce the plastic impression, a navigation apparatus for the spatial representation of the digital map detail according to one exemplary embodiment can have the processor module customized or set up to associate a first digital color code with the digital geodata for a first topological height value and to associate a second digital color code with the digital geodata for a second, possibly adjacent, height value, the second digital color code may differ from the first digital color code only slightly. Hence, different color codes can be provided as visual perception values for different topological height values, which different color codes, in combination with the stipulated perspective stipulation variable, produce a perceptible plasticity for a navigation map. In this case, color codes that are associated with adjacent discrete height values can, according to exemplary embodiments, differ only slightly to obtain a "soft" transition between adjacent height values. Thus it becomes possible to convey the overall impression of a sometimes only two-dimensional navigation map with height differences without the complex technical implementation of an actual three-dimensional height model. A combination of the color gradations, stipulated by the color code, for the representation of the various topological heights and if need be with the light source stipulation variable additionally allows a light and shade interaction to be produced on height models and 3D building models, which conveys a spatially realistic perception of the navigation map.

The color code used may be an RGB color space, for example, which simulates the color perceptions as an additive color space by means of additive mixing of three primary colors, red, green and blue. Other color codes, such as the CMYK color model, can likewise be used for the color representation of different height values.

It is also possible to use textures defined by means of a texture code, i.e. images or patterns that are on the surface of the objects to be mapped. In this case, a navigation apparatus for the spatial representation of a digital map detail according to one exemplary embodiment can have the processor module customized or set up to associate a first digital texture code with the digital geodata for a first height value and to associate a second digital texture code with the digital geodata for a second height value. The use of different textures for representing different topological height values is particularly advantageous for users with a color weakness.

Since the computation of the visual perception values for different topological height values by the processor module can result in a high level of computation complexity, it is possible, according to some exemplary embodiments, to use statically defined lookup tables that store digital visual perception values that correspond to different height values. It is therefore optionally possible for a navigation apparatus for the spatial representation of a digital map detail according to one exemplary embodiment to have an electronic memory area with a lookup table stored therein that stores digital visual perception values that correspond to different height values.

The static storage of visual perception values that correspond to different height values means that complex computations and accordingly a high level of memory consumption are avoided in the course of ascertaining the visually differently perceptible projection of the geodata that corresponds to the height information. Use of lookup tables is found to be particularly advantageous, particularly in the case of quickly changing surroundings, for example at high speed of travel, when the map detail needs to be updated quickly.

Optionally, a navigation apparatus for the spatial representation of a digital map detail according to one exemplary embodiment can have the lookup table storing color codes that correspond to different height values, wherein an association for a day representation of the digital map detail with two-dimensional (or 2.5D) geodata can be made according to the following association of RGB values with topological height values:

| Height | R | G | B |
|---|---|---|---|
| 50 ± 50 | 187 ± 30% | 206 ± 30% | 176 ± 30% |
| 100 ± 50 | 173 ± 30% | 188 ± 30% | 165 ± 30% |
| 200 ± 100 | 143 ± 30% | 166 ± 30% | 139 ± 30% |
| 500 ± 200 | 97 ± 30% | 124 ± 30% | 100 ± 30% |
| 1000 ± 500 | 77 ± 30% | 95 ± 30% | 80 ± 30% |
| 1500 ± 500 | 62 ± 30% | 75 ± 30% | 70 ± 30% |
| 2000 ± 500 | 54 ± 30% | 58 ± 30% | 58 ± 30% |
| 3000 ± 500 | 88 ± 30% | 87 ± 30% | 69 ± 30% |
| 4000 ± 500 | 127 ± 30% | 126 ± 30% | 99 ± 30% |

For example, the height statement can involve metric statements, such as mm, cm, dm, m or km. Other parameters, such as yards, miles, etc., are likewise conceivable. In this case, the value "50±50" means that the corresponding height value can be between 0 and 100 units of height. Accordingly, "100±50" means that the corresponding height value can be between 50 and 150 units of height, etc. The color values can be represented as unsigned 8-bit values merely by way of example. In each case, the statement "±30%" means that the corresponding color value can differ from the indicated mean value by up to 30% of the mean color value in an upward or downward direction. Optionally the color values each differ from the indicated mean value by less than 20% and may even differ by less than 10% of the mean color value in an upward or downward direction.

Optionally, a navigation apparatus for the spatial representation of a digital map detail according to one exemplary embodiment can have the lookup table storing color codes that correspond to different height values, so that an association for a night representation of the digital map detail using two-dimensional geodata is made according to the following association of RGB values with topological height values:

| Height | R | G | B |
|---|---|---|---|
| 50 ± 50 | 26 ± 30% | 31 ± 30% | 24 ± 30% |
| 100 ± 50 | 38 ± 30% | 47 ± 30% | 36 ± 30% |
| 200 ± 100 | 57 ± 30% | 67 ± 30% | 56 ± 30% |
| 500 ± 200 | 64 ± 30% | 79 ± 30% | 65 ± 30% |
| 1000 ± 500 | 72 ± 30% | 89 ± 30% | 75 ± 30% |
| 1500 ± 500 | 84 ± 30% | 104 ± 30% | 83 ± 30% |
| 2000 ± 500 | 95 ± 30% | 119 ± 30% | 94 ± 30% |
| 3000 ± 500 | 120 ± 30% | 148 ± 30% | 129 ± 30% |
| 4000 ± 500 | 158 ± 30% | 180 ± 30% | 163 ± 30% |

Optionally, a navigation apparatus for the spatial representation of a digital map detail according to one exemplary embodiment can have the lookup table storing color codes that correspond to different height values, with an association for a day representation of the digital map detail using three-dimensional geodata being made according to the following association of RGB values with topological height values:

| Height | R | G | B |
|---|---|---|---|
| −1000 ± 500 | 234 ± 30% | 255 − 30% | 217 ± 30% |
| −200 ± 100 | 234 ± 30% | 255 − 30% | 217 ± 30% |
| 0 ± 50 | 209 ± 30% | 229 ± 30% | 197 ± 30% |
| 50 ± 50 | 209 ± 30% | 229 ± 30% | 197 ± 30% |
| 100 ± 50 | 187 ± 30% | 206 ± 30% | 176 ± 30% |
| 200 ± 100 | 187 ± 30% | 206 ± 30% | 176 ± 30% |
| 500 ± 200 | 149 ± 30% | 170 ± 30% | 140 ± 30% |
| 1000 ± 500 | 123 ± 30% | 145 ± 30% | 114 ± 30% |
| 1500 ± 500 | 102 ± 30% | 124 ± 30% | 103 ± 30% |
| 2000 ± 500 | 93 ± 30% | 112 ± 30% | 95 ± 30% |
| 3000 ± 500 | 112 ± 30% | 117 ± 30% | 92 ± 30% |
| 4000 ± 500 | 134 ± 30% | 140 ± 30% | 110 ± 30% |
| 5000 ± 500 | 158 ± 30% | 165 ± 30% | 130 ± 30% |
| 6000 ± 500 | 193 ± 30% | 198 ± 30% | 171 ± 30% |
| 7000 ± 500 | 193 ± 30% | 198 ± 30% | 171 ± 30% |
| 8000 ± 500 | 193 ± 30% | 198 ± 30% | 171 ± 30% |

Optionally, a navigation apparatus for the spatial representation of a digital map detail according to one exemplary embodiment can have the lookup table storing color codes that correspond to different height values, with an association for a night representation of the digital map detail using three-dimensional geodata being made according to the following association of RGB values with topological height values:

| Height | R | G | B |
|---|---|---|---|
| −1000 ± 500 | 31 ± 30% | 31 ± 30% | 31 ± 30% |
| −200 ± 100 | 31 ± 30% | 31 ± 30% | 31 ± 30% |
| 0 ± 50 | 38 ± 30% | 47 ± 30% | 36 ± 30% |
| 50 ± 50 | 38 ± 30% | 47 ± 30% | 36 ± 30% |
| 100 ± 50 | 47 ± 30% | 58 ± 30% | 45 ± 30% |
| 200 ± 100 | 57 ± 30% | 67 ± 30% | 56 ± 30% |
| 500 ± 200 | 64 ± 30% | 79 ± 30% | 65 ± 30% |
| 1000 ± 500 | 72 ± 30% | 89 ± 30% | 75 ± 30% |
| 1500 ± 500 | 84 ± 30% | 104 ± 30% | 83 ± 30% |
| 2000 ± 500 | 95 ± 30% | 119 ± 30% | 94 ± 30% |
| 3000 ± 500 | 120 ± 30% | 148 ± 30% | 129 ± 30% |
| 10 000 ± 5000 | 158 ± 30% | 180 ± 30% | 163 ± 30% |

In other words, such lookup tables provide parameterization for the topological heights taking account of a day/night representation of the digital map detail. According to some exemplary embodiments, the height/color associations defined by means of the lookup tables can be made available to a software-implemented and/or hardware-implemented graphics processor, for example within the context of what is known as a programming interface (Application Programming Interface (API)).

In the case of all of the preceding height/color associations, it can be seen that the color codes (RGB values) that are associated with the adjacent height values differ from one another to such a small extent that the viewer is provided with a "fluent" color characteristic impression. According to some exemplary embodiments, individual color values (e.g. R, G, B values) of adjacent height values (which can differ by up to 1000 units of height) differ from one another by no more than 30%. That is to say that $0.7<(X[h\pm1]/X[h])<1.3$, where $X[h\pm1]$ represents a color value (e.g. R, G or B value) that corresponds to a height index $h\pm1$ that is adjacent to the height index $h$.

Optionally, a navigation apparatus for the spatial representation of a digital map detail according to one exemplary embodiment can have the desired viewer perspective adjusted by means of an altered or alterable perspective stipulation variable. The perspective stipulation variable may thus be adjustable, for example using a man-machine interface of the navigation apparatus. Optionally, the perspective stipulation variable can correspond to a (virtual) height above the earth's surface that can be used to set a viewing angle between the viewing direction and the earth's surface. In other words, the perspective stipulation variable can be modeled as a zoom level of a (virtual) camera arranged in the three-dimensional space, the camera angle being stipulated as the image angle of the camera by or by means of the viewing angle.

Optionally, a navigation apparatus for the three-dimensional representation of a digital map detail according to one exemplary embodiment can have, in the electronic memory area, a further lookup table stored therein that stores viewing angles that correspond to different height values according to the following table:

| Height | Viewing angle (°) |
|---|---|
| 30-750 m | 34 ± 10% |
| 1-4 km | 34 ± 10% |
| 6-8 km | 36 ± 10% |
| 10 km | 37 ± 10% |
| 15 km | 38 ± 10% |
| 20-30 km | 39 ± 10% |
| 40 km | 42 ± 10% |
| 50 km | 45 ± 10% |
| 60 km | 48 ± 10% |
| 80 km | 54 ± 10% |
| 100 km | 60 ± 10% |
| 125 km | 63 ± 10% |
| 150 km | 66 ± 10% |
| 175 km | 69 ± 10% |
| 200 km | 72 ± 10% |
| 300 km | 78 ± 10% |
| 400 km | 81 ± 10% |
| 500 km | 84 ± 10% |
| 600 km | 87 ± 10% |
| 1000 km | 90 − 10% |
| 1500 km | 90 − 10% |
| 2000 km | 90 − 10% |
| 2500 km | 90 − 10% |

In this case too, the lookup table can be used to provide a defined height-angle association according to some exemplary embodiments for a software-implemented and/or hardware-implemented graphics processor, for example within the context of what is known as a programming interface (Application Programming Interface (API)), such as OpenGL (Open Graphics Library), which is a specification for a platform-independent and programming-language-independent programming interface for developing 2D and 3D computer graphics. The statement "±10%" in the table above means, in each case, that the corresponding viewing angle can differ from the stated mean value by up to 10% of the mean angle value in an upward or downward direction. Optionally the viewing angles each differ from the indicated mean value by less than 5% and may even differ by less than 2% of the mean angle value in an upward or downward direction.

Hence, it becomes possible to define a perspective view of a map detail at a stipulated (by the user) viewing angle relative to the earth. The viewing angle can be increased to present the map detail from further above, as a result of which a larger-area map detail is presented. The increased viewing angle when a larger-area map detail is presented can improve comprehension of the surroundings around the geographical position for the user.

A vehicle is also provided that comprises a navigation apparatus for the spatial representation of a digital map detail around a geographical position on the earth's surface on the basis of digital geodata according to one exemplary embodiment, wherein the geographical position represents a current or a desired vehicle position.

According to a further disclosed embodiment, a method for the spatial representation of a digital map detail around a geographical position on the earth's surface on the basis of digital geodata is provided, wherein the digital geodata also comprise height information. The method has the following steps:

reading-in of the digital geodata;
reading-in of the coordinates of the geographical position;
reading-in of a perspective stipulation variable that corresponds to a desired viewing direction to the position;
ascertainment, on the basis of the perspective stipulation variable and the geographical position, of a coordinate transformation for the geodata that corresponds to the desired viewing direction;
association of different visual perception values for different topographical height values of the geodata to obtain a visually differently perceptible projection of the geodata that corresponds to the height information; and
output of output data that correspond to the visually differently perceptible projection of the geodata that corresponds to the height information.

As has already been explained in connection with the navigation apparatus, a navigation method according to one exemplary embodiment can also provide a user with a plastic representation of the roads and buildings surrounding him and of the terrain relief surrounding him on a display apparatus, particularly on a navigation display, which allows the driver to assess his surroundings in an improved manner. Such a representation is useful particularly when the vehicle is traveling at high speed, or when visual conditions are poor.

In addition, a computer program having a program code that is suitable for performing a method according to one exemplary embodiment when the computer program is executed on a programmable hardware component may optionally be provided.

Exemplary embodiments provide a fully-fledged spatial height representation on a navigation map that conveys a spatial realistic perception through a combination of height model, color gradation and light influence. In this case, parameterization of viewing angles be means of viewing heights, in other words parameterization of camera angles by means of zoom levels, the color gradations for the representation of the various topological heights and also the light sources for producing light and shade interaction on height models and three-dimensional objects, decides on the spatially realistic perception of the navigation map.

In the description of the enclosed illustrations that follows, identical reference symbols denote identical or comparable components. In addition, synoptic reference symbols are used for components and objects that occur repeatedly in one exemplary embodiment or in an illustration but are described together in respect of one or more features. Components or objects that are described using identical or synoptic reference symbols can be embodied identically or else differently, as appropriate, in respect of single, multiple or all features, for example in respect of their dimensions, unless the description explicitly or implicitly reveals otherwise.

FIG. 1 shows a schematic illustration of a basic design for a navigation apparatus 100 for the spatial representation of a digital map detail according to one exemplary embodiment.

The navigation apparatus 100 comprises a first input interface 110 that is used to obtain digital geodata, that is to say information that relates to towns or regions on the earth. In particular, the first input interface 110 is also used to read in height information or values for the region of the earth's surface that is represented in the digital map detail. According to exemplary embodiments, the digital geodata are thus at least what are known as 2½D or 2.5D data. In comparison with pure 2D data, where every point of an object in question requires two numerical statements for its position, 2½D has the third coordinate (i.e. the height) stored only as an attribute, that is to say not in a spatial structure. Typical examples of 2½D structures are, for example, right-angled coordinates plus a metric scalar (e.g. height) as an attribute for the point, or geographical latitude/longitude plus an arbitrary attribute (e.g. slope of terrain, gravitational force, vegetation, height, etc.). While 2D involves point data on a (flat or curved) surface, it is possible to use 2½D data to construct a virtual spatial model, with the height, e.g. a digital terrain model. The height information may naturally also be part of a true 3D model, i.e. 3D geodata. In contrast to 2½D, a true 3D model also allows spatial correlations of all attributes or sectional methods for lines and surfaces in space. Examples of the latter are insolation (as a function of slope gradient and direction) or the intersection of geological layers with the terrain. For example, the first input interface 110 may be embodied as a reading drive for a CD-ROM that contains the digital 2½D or 3D geodata.

A second input interface 120 of the navigation apparatus 100 can be used to read coordinates (e.g. latitude/longitude) for the geographical position, for example for the current vehicle position, into the navigation system. For example, the second input interface 120 may be embodied as a communication interface with a GPS locating device (not shown) for ascertaining the current vehicle position.

A third input interface 130 of the navigation apparatus 100 can be used for the input of a desired viewing direction or desired viewing height by the user to stipulate a perspective from which the user wishes to view the geographical position on a display apparatus. Thus, the user can stipulate that he wishes to view the roads and the surroundings from a desired (virtual) height, for example 100 m above the vehicle or the earth's surface. In some exemplary embodiments, the virtual viewing point may be not just above but constantly also behind the vehicle position. The desired viewing height can then be converted into a viewing angle that is understood by a rendering program, for example.

A fourth input interface 140 of the navigation apparatus 100 can optionally be used to read in further input data that model a (virtual) light source. In this case, these input data are represented as at least one light source stipulation variable, for example, a vector. The light source stipulation variable can comprise statements about the height, the angle, the intensity and/or the direction of the light source relative to the geographical position that is to be displayed.

In addition, the navigation apparatus 100 comprises a processor module 150 that can electronically process the data that are input via the four input interfaces 110, 120, 130, 140. On the basis of the perspective, stipulated by means of the perspective stipulation variable, and the geographical position, the processor module 150 can ascertain a coordinate transformation or projection of the digital 2D or 3D geodata that corresponds to the desired viewing direction. In this case, the digital geodata can be converted into a notionally perspective virtual-3D or 3D view, for example by means of a central projection, by the processor module using image reproduction techniques through scaling, rotation and displacement. This is mapping that maps points in the three-dimensional space onto points in a given plane. To enhance the resultant perspective or plastic effect, it is additionally possible for the processor module 150 to associate different visual perception values, such as different colors, for different topological height values of the digital 2.5D or 3D geodata with the geodata transformed on the basis of the stipulated perspective. In this case, it is possible to use special predefined color tables, for example, that define a soft or fluent color characteristic between adjacent discrete height values. In this way, processor output data that code a visually differently perceptible (perspective) projection of the geodata that corresponds to the height information are obtained. The output data obtained in this manner are output to a display apparatus 170 of the navigation apparatus 100 via an output interface 160.

Figure 2:
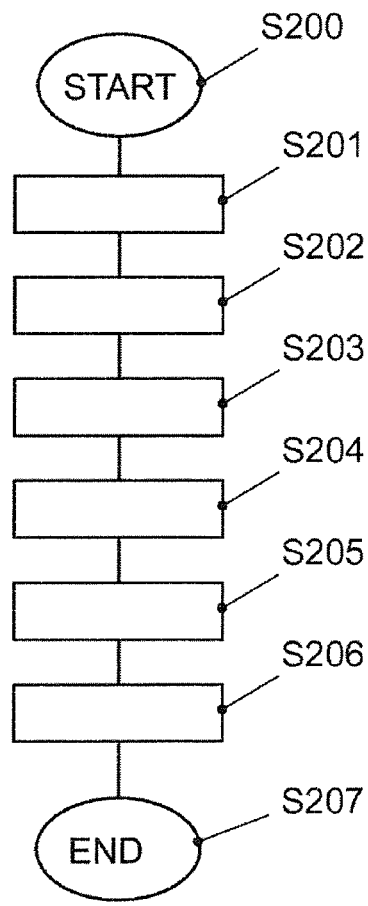
FIG. 2 shows a schematic flowchart for a method for the spatial representation of a digital map detail according to at least one exemplary embodiment.

FIG. 2 shows a flow chart for a method for the spatial representation of a digital map detail according to one exemplary embodiment. The method may be a computer-implemented or computer-implementable method whose method steps can be performed by a computer or a programmable hardware component.

After the method starts in step S200, the digital 2.5D or 3D geodata are first of all read in via the first input interface 110 of the navigation apparatus 100 in step S201. In step S202 the coordinates of the geographical position are read in via the second input interface 120. For this, steps S201 and S202 can be performed sequentially or else in parallel. In step S203, the third input interface 130 is used to read in at least one perspective stipulation variable that corresponds to a desired viewing direction to the geographical position. In an exemplary embodiment, the perspective stipulation variable is a viewing height that is input by the user. The viewing height indicates the virtual height from which the user wishes to view the surroundings around the geographical position. In other words, the viewing height corresponds to a zoom level of a virtual camera that is in the space—the lower the viewing height, the greater the zoom or magnification level. For example, the zoom level can be input using input means (not shown) of the navigation apparatus 100. It is conceivable for an implementation to involve the use of a rotary switch or the use of control panels on a touchscreen that the user can use to set the zoom level. Direct input of numerical values, for example using a keypad and/or a touchscreen, are likewise possible. In step S204, on the basis of the perspective stipulation variable and the geographical position, a coordinate transformation or projection of the 2D or 3D geodata that corresponds to the desired viewing direction is ascertained. In step S205, different visual perception values (e.g. colors, textures, shading, etc.) are associated with different topographical height values in the geodata to obtain a visually differently perceptible transformation or projection of the geodata that corresponds to the height information. In step S206, the processor module 150 outputs resultant output data, which correspond to the visually differently perceptible projection of the geodata that corresponds to the different height information, to the display apparatus 170 to obtain a graphical display of the edited geodata.

In the case of 2D or 2½D geodata as input data, a predetermined viewing angle, i.e. a camera angle of 30°±10°, for example, can be stipulated in step S104 by means of all the zoom levels. In the case of 3D geodata as input data, different viewing angles can be taken into account on the basis of different zoom levels, as will be explained further on in conjunction with FIG. 6.

Figures 3A, 3B, 3C:
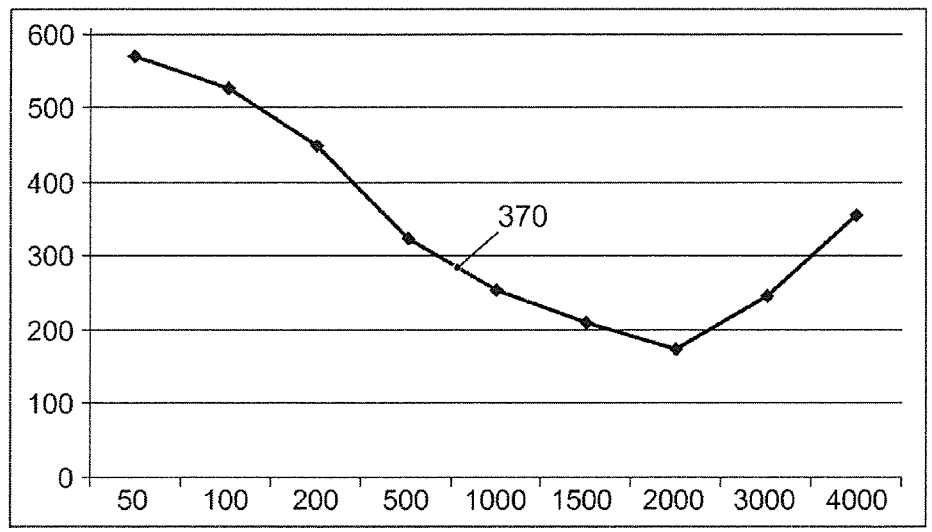
FIG. 3a shows a lookup table that associates corresponding RGB values with different height values for a day representation of the digital map detail using two-dimensional geodata.
FIG. 3b shows a lookup table that associates corresponding RGB values with different height values for a night representation of the digital map detail using two-dimensional geodata.
FIGS. 3c-3d show color graphs that indicate a color characteristic between adjacent height sections in day/night representation for two-dimensional geodata.

FIGS. 3a and 3b each show a lookup table (LUT) 300 and 350 that associates corresponding RGB values with respective different height values as visual perception values, for a day representation (see FIG. 3a) and for a night representation (see FIG. 3b) of the digital map detail using just 2D or 2½D geodata.

The first or left-hand column 302 of the day representation 300 contains various height values in a stipulated unit of height. This may be a metric unit, such as m or km, or else Anglo-American units of measurement, for example yards or miles. The second column 304 of the lookup table in FIG. 3a shows colored reproductions of the RGB color codes associated with the respective height values 302. The third, fourth and fifth columns 306, 308, 310 indicate the red, green and blue values, respectively, of the color code used as RGB values. The last column 312 contains a transparency value (A value). The RGB values 306, 308, 310 and the transparency value 312 are indicated as integer values in the range between 0 and 255, corresponding to exemplary 8-bit coding.

Accordingly, the first or left-hand column 352 of the night representation 350 contains various height values of the unit of height. The second column 354 of the lookup table in FIG. 3b shows colored reproductions of the RGB color codes associated with the respective height values 352. The third, fourth and fifth columns 356, 358, 360 indicate the red, green and blue values, respectively, of the color code used as RGB values. The last column 362 again contains a transparency value (A value).

The individual color values (R, G, B) can each differ from the indicated mean value by up to 30% of the mean color value shown in the tables in an upward or downward direction. Optionally the R, G, B color values even differ from the indicated mean value by less than 20% and may even differ by less than 10% of the mean color value in an upward or downward direction in each case. The height differences between adjacent height values are between 10 and 1000 units of height in this case.

FIG. 3c shows the fluent color characteristic 370 between adjacent height sections or values in the day representation as per FIG. 3a for 2D or 2½D geodata, as a function of height value versus checksum for the corresponding RGB value, that is to say a sum over the individual R, G, B values. In this case, the abscissa axis indicates the adjacent discrete height values and the ordinate axis indicates the checksum for the associated color code value. As can be seen from the graph in FIG. 3c, a fluent color characteristic is obtained between adjacent height sections, with a slight difference between the adjacent shades. The checksums for color values that are adjacent in terms of height also differ from one another, optionally by no more than 30% of a checksum.

Figure 3D:
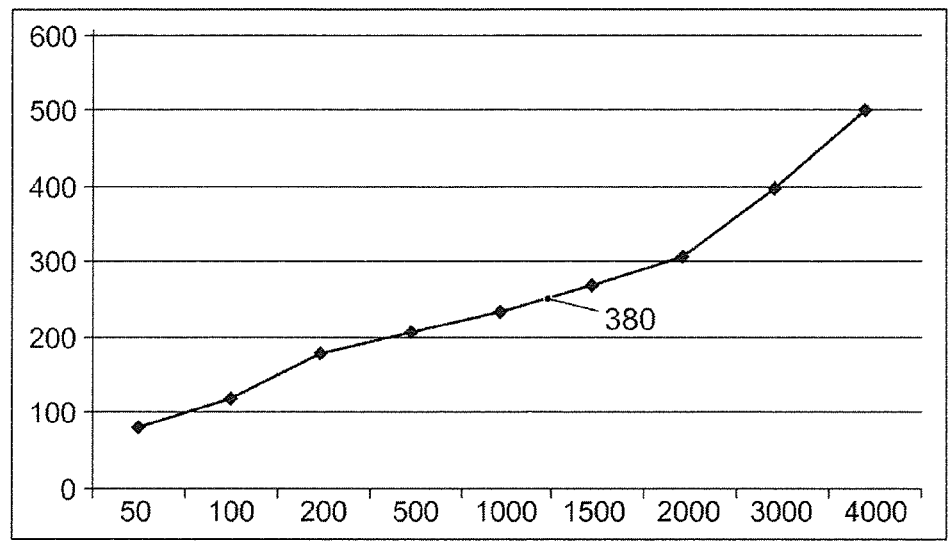

FIG. 3d shows a corresponding fluent color characteristic 380 for the night representation as per FIG. 3b. Adjacent height values have an even smaller color difference in this case than in the case of the day representation. That is to say that the checksums for color values that are adjacent in terms of height differ from one another, optionally by no more than 20% of one of the adjacent color value checksums in this case. This allows realistic representation of the map section that is geared to the respective day/night circumstances.

In the case of the height/color associations shown in FIGS. 3a and 3b, it can be seen that color codes (RGB values) that are associated with adjacent height values differ from one another to such a small extent that the viewer is provided with a "fluent" color characteristic impression. According to some exemplary embodiments, single color values (e.g. R, G, B values) for adjacent height values also differ from one another by no more than 30%. That is to say that $0.7<(X[h\pm1]/X[h])<1.3$, where $X[h\pm1]$ represents a color value (e.g. R, G, B value) that corresponds to a height index $h\pm1$ that is adjacent to the height index h. According to other exemplary embodiments, the checksums for the color values of adjacent height values differ from one another—as described above—by no more than 30%. That is to say that $0.7<(X[h\pm1]/X[h])<1.3$, where $X[h\pm1]$ represents a checksum for a color value that corresponds to a height index $h\pm1$ that is adjacent to the height index h. Optionally, the difference is actually less than 20%. In this case, the height values differ by at least 50 (meters) and no more than by 1000 (meters) according to one exemplary embodiment.

Figure 4A:
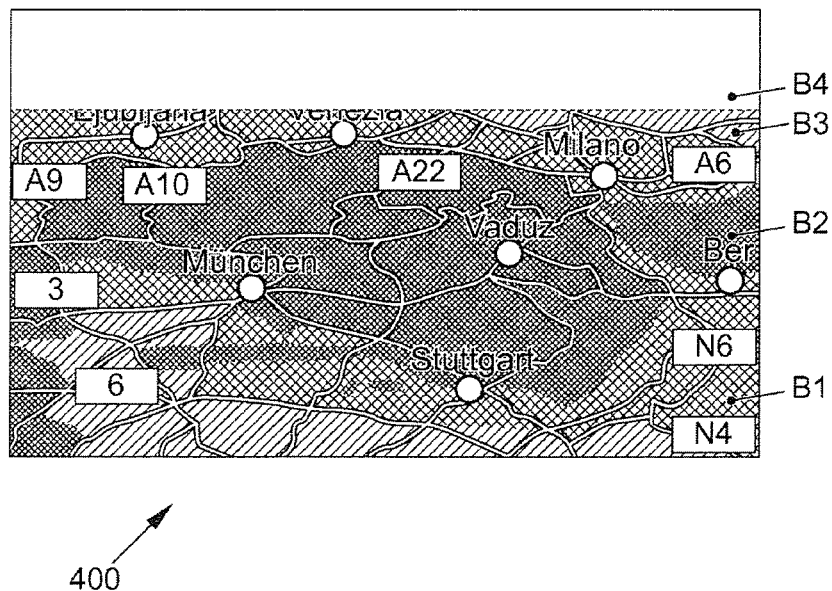

FIG. 4a shows a plastic representation, resulting from the color table 300 in FIG. 3a, of a map section 400 for a day representation, with color gradations corresponding to the height/color association table from FIG. 3a. The map 400 shows differently colored regions. A dark region B2 corresponds to higher surroundings, for example mountains, such as the Alps. By contrast, the regions B1 and B3 denote geographical surroundings with lower topological heights and, according to the first rows of the table shown in FIG. 3a, are represented in a lighter shade than the region B2. The region B4 of the upper edge of the image represents a particular color characteristic that is used to represent an artificial or virtual horizon, as will be described further on in conjunction with FIG. 9.

Figures 4B, 5A, 5B:
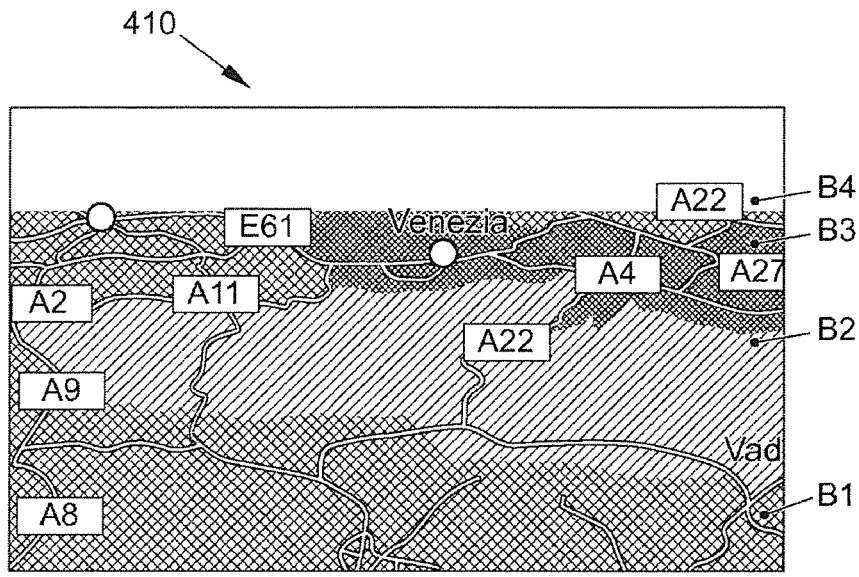
FIG. 4b shows a plastic representation of a 2½D map section for a night representation with color gradations corresponding to the lookup table from FIG. 3b.
FIG. 5a shows a lookup table that associates corresponding RGB values with different height values for a day representation of the digital map detail using three-dimensional geodata.
FIG. 5b shows a lookup table that associates corresponding RGB values with different height values for a night representation of the digital map detail using three-dimensional geodata.

FIG. 4b shows a plastic representation of a map section 410 for a night representation, with color gradations corresponding to the lookup table from FIG. 3b. In this case too, the fluent color characteristic is clearly visible, but the differences between adjacent color regions B1, B2, B3 and B4 are even smaller than in the day representation from FIG. 4a, this corresponding to a realistic night perception. Furthermore, higher regions B2 are represented here in a lighter shade than contrastingly lower regions B1 and B3.

If the digital geodata are present as true 3D geodata, various topological height values can be parameterized by using accordingly customized lookup tables, as shown in FIGS. 5a and 5b. In this case too, differently distinguished color gradations are used for different height values on the basis of the day or night representation.

The first or left-hand column 502 of the 3D day representation 500 again contains various height values in a stipulated unit of height. The second column 504 of the lookup table in FIG. 5a shows colored reproductions of the RGB color codes associated with the respective height values 502. The third, fourth and fifth columns 506, 508, 510 indicate the red, green and blue values, respectively, of the color code used as RGB values. The last column 512 contains a transparency value (A value). The RGB values 506, 508, 510 and the transparency value 512 are indicated as, once again, integer values in a range between 0 and 255, corresponding to exemplary 8-bit coding.

Accordingly, the first or left-hand column 552 of the 3D night representation 550 contains fewer height values than in the 3D day representation 500. The second column 554 of the lookup table in FIG. 5b shows colored reproductions of the RGB color codes associated with the respective height values 552. The third, fourth and fifth columns 556, 558, 560 indicate the red, green and blue values, respectively, of the color code used as RGB values. The last column 562 again contains a transparency value (A value), which is at the maximum, so as also to display the road network.

Figure 5C:
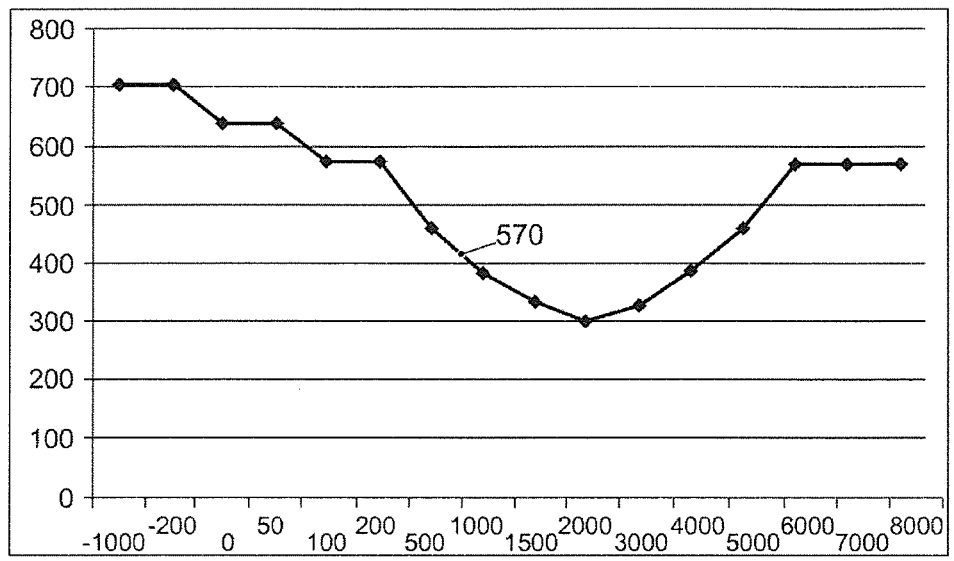
FIGS. 5c-5d show color graphs that indicate a color characteristic between adjacent height sections in day/night representation for three-dimensional geodata.
Figure 5D:
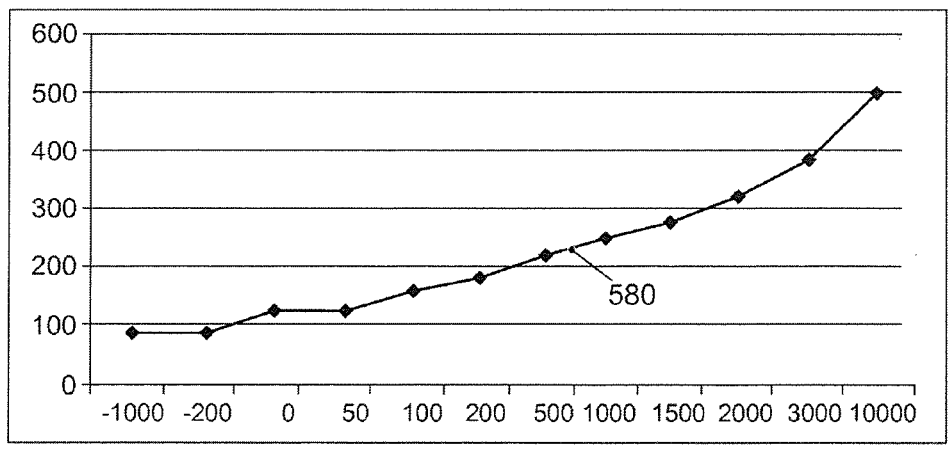

As in the case of 2D or 2½D geodata, the color characteristic for true 3D geodata is also fluent between adjacent height values, so that no hard edges arise on the navigation map at the transition between adjacent regions. In this case too, single color values (e.g. R, G, B values) for adjacent height values differ from one another, optionally by no more than 30%. That is to say that $0.7<(X[h\pm1]/X[h])<1.3$, where $X[h\pm1]$ represents a color value (e.g. R, G or B value) that corresponds to a height index $h\pm1$ that is adjacent to the height index h. In particular, the checksums for the color values of adjacent height values differ from one another by no more than 30%. That is to say that $0.7<(X[h\pm1]/X[h])<1.3$, where $X[h\pm1]$ represents a checksum for a color value that corresponds to a height index $h\pm1$ that is adjacent to the height index h. Optionally, the color difference between adjacent height values is actually less than 20%. In this case, the height values differ by at least 50 (meters) and no more than by 1000 (meters) according to one exemplary embodiment. This is shown in FIGS. 5c and 5d, which correspond to FIGS. 3c and 3d and are therefore not explained in more detail.

Figure 5E:
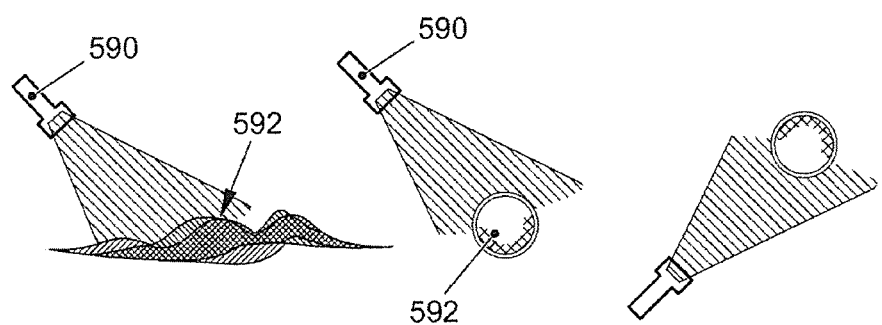
FIG. 5e schematically shows a virtual light source.

In addition to the color gradations for representing the various topological heights, in the case of 3D geodata it is possible to parameterize the viewing direction or the camera angle by means of zoom levels, and take account of a virtual light source for producing light and shade interaction. This is shown schematically in FIG. 5e, which presents a virtual light source 590 and objects 592 lit thereby. Depending on where the light source 590 is situated, locations of light and shade are obtained that convey a plastic impression.

An example of parameterization of the camera or viewer angle by means of zoom levels is shown in table 600 in FIG. 6.

In this case, an angle of 90° corresponds to a viewing perspective from directly or a very long way above the geographical position, e.g. for viewer heights above 1000 km. By contrast, an angle of 0° corresponds to a viewing perspective as seen from the geographical position, i.e. in this case the camera position matches the geographical position. A virtual viewer height from 30 m to 5 km can correspond to an angle of 34°. From a height of from 6 km to 1000 km, the viewer angle can increase progressively from 34° to 90°. In other words, the camera can move on a fictitious circle around the geographical position, and the lower the viewing height the shallower the camera angle becomes.

Figure 7A:
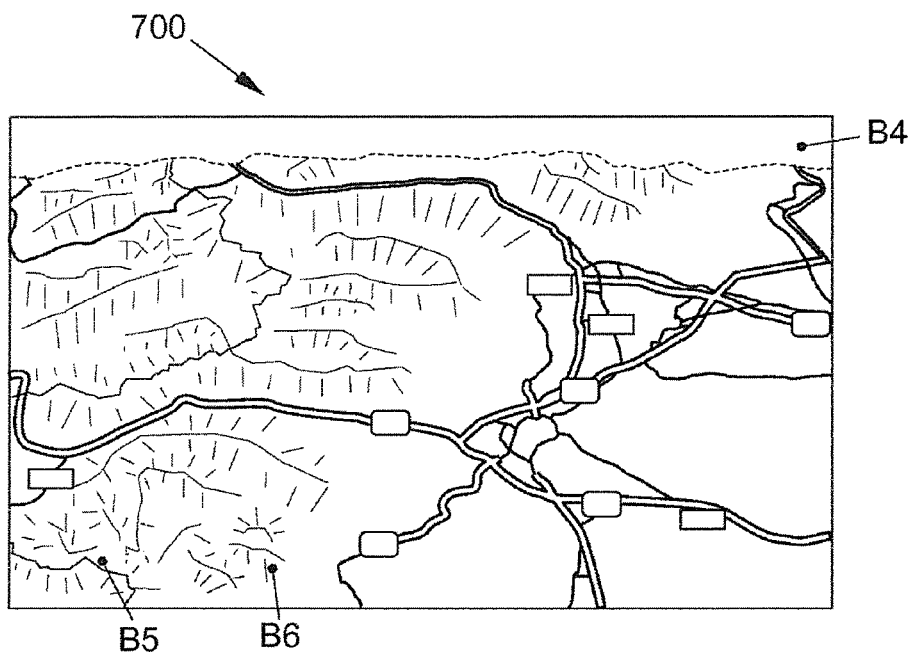
FIGS. 7a-7b show a further exemplary embodiment of spatially plastic representations of a map section using three-dimensional geodata.
Figure 7B:
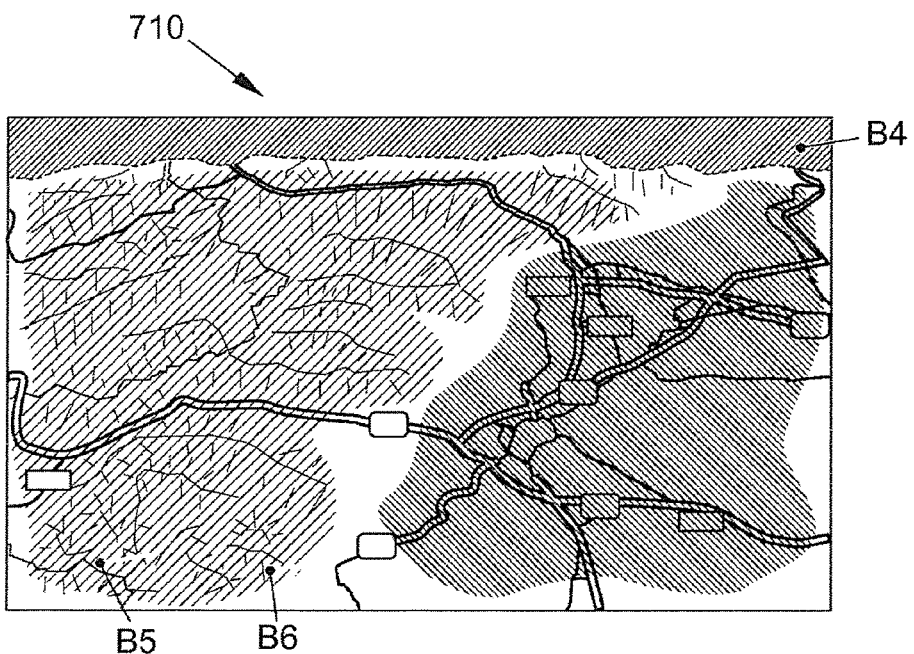

FIG. 7a shows a plastic representation of a map section 700 for a day representation, with the parameterization of camera angle by means of the zoom levels that is shown in FIG. 6 and the color gradations in accordance with the lookup table from FIG. 5a. A plastic representation of a map section 710 for a night representation, with the parameterization of camera angle by means of the zoom levels that is shown in FIG. 6 and the color gradations in accordance with the lookup table from FIG. 5b, is shown in FIG. 7b.

Compared to the exemplary embodiment shown in FIGS. 4a and 4b, the map details 700 and 710 shown in figures a and 7b involve a spatial realistic perception of the navigation map additionally being enhanced by the use of a virtual light source, since objects that have a topological height are represented not only in different colors but also with corresponding shading. Thus, the map section in FIGS. 7a and 7b shows differently shaded regions B5 and B6 that indicate mountains of different heights and are therefore able to improve plastic representation even further.

For example, the virtual light source for a 3D rendering unit can be parameterized in accordance with the following settings, which may be specified as XML code (XML=Extensible Markup Language), for example:

```
<lightmode="head"type="directional"azimuth="-20"tilt="30"
ambient="0.6"squarebrightness="false"usage="default"/>
```

In this case, the parameter "light mode=head" means that the light source is at a fixed location in the space, regardless of the position of the virtual camera. The attribute "type=directional" states that the light source is at a mathematically infinite distance from the geometry and hence every object in the rendering scene is lit from the same direction depending on azimuth and tilt (simulation of the sun), "azimuth" being an angle of rotation for the light source in relation to a virtual zero point in the map representation. "tilt" determines an angle of tilt of the light source. "ambient" describes a brightness of the light source and hence a perceptible contrast. The parameter "squarebrightness" is irrelevant because it is not used. The parameter "usage" describes whether the light source described lights the general scenery or the carsor (vehicle symbol) separately.

Figure 7C:
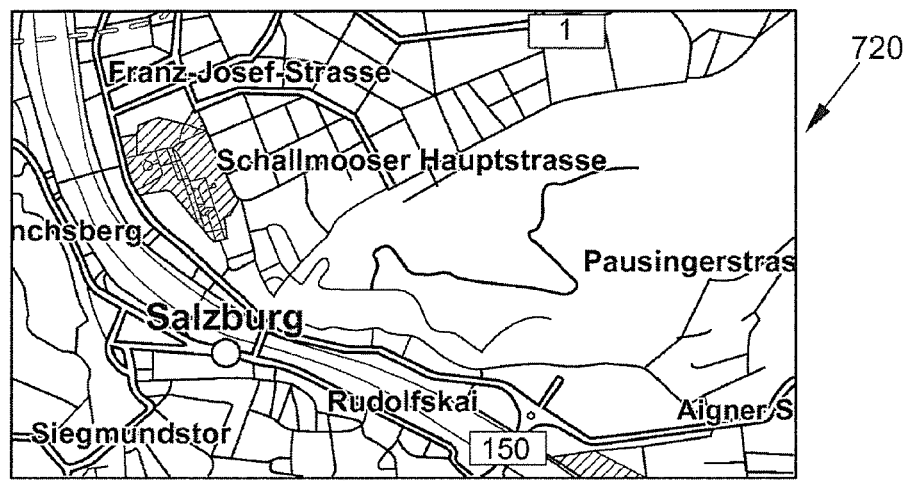
FIG. 7c shows a plan view of a spatially plastic representation of a map detail with 2½D geodata.

A further exemplary embodiment of a spatially plastic representation of a map section 720 is shown by FIG. 7c. Compared to FIGS. 7a and 7b, this figure shows a bird's eye perspective (i.e. viewer angle 90°) with a plastic appearance on account of color shading and possibly additional light/shade effects.

Figure 8:
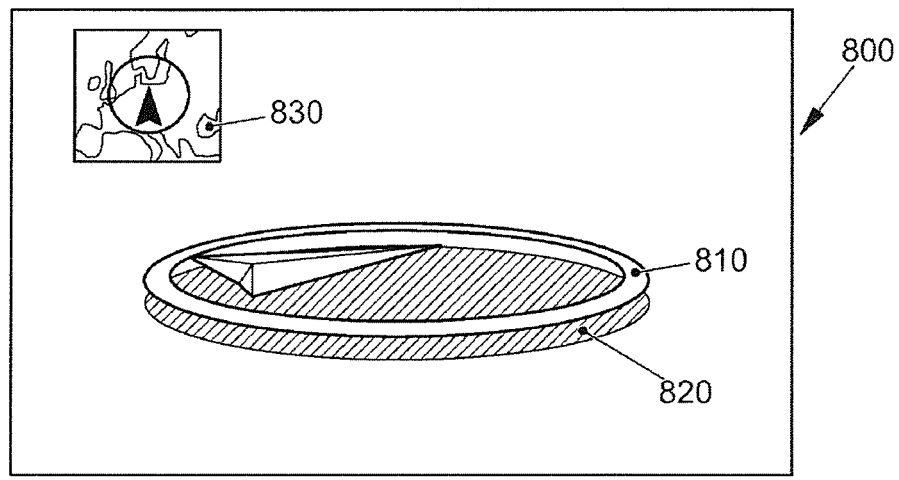
FIG. 8 shows a plastic representation of a vehicle symbol and a detail from a map with a plastic vehicle symbol represented thereon.

FIG. 8 shows a plastic representation 800 of a vehicle symbol 810 and a detail 830 from a map with a plastic vehicle symbol 810 represented thereon. The three-dimensional vehicle symbol 810 can be used to denote the current vehicle position on the electronic navigation map. The vehicle symbol 810 can be rendered as a 3D model with a special inner curvature at a distance above the navigation map. Underneath, it is possible for a semitransparent grey bitmap 820 customized to the 3D vehicle model 810 to be depicted. In addition, a virtual light source is defined (not shown) that produces light and shade interaction for the 3D vehicle model 810, particularly for a virtual movement of the map. The combination of these three elements gives the impression of a plastic vehicle symbol hovering over the map, which develops a particular type of depth effect as a result of the influence of the light and the underlying grey shadow 820.

The plastic representation 800 of the vehicle symbol 810 that is shown in FIG. 8 has had the light source parameterized for example according to the following settings:

```
<lightmode="head"type="directional"azimuth="80"
tilt="60"ambient="0.5"squarebrightness="false"usage="carsor"/>
```

Figure 9:
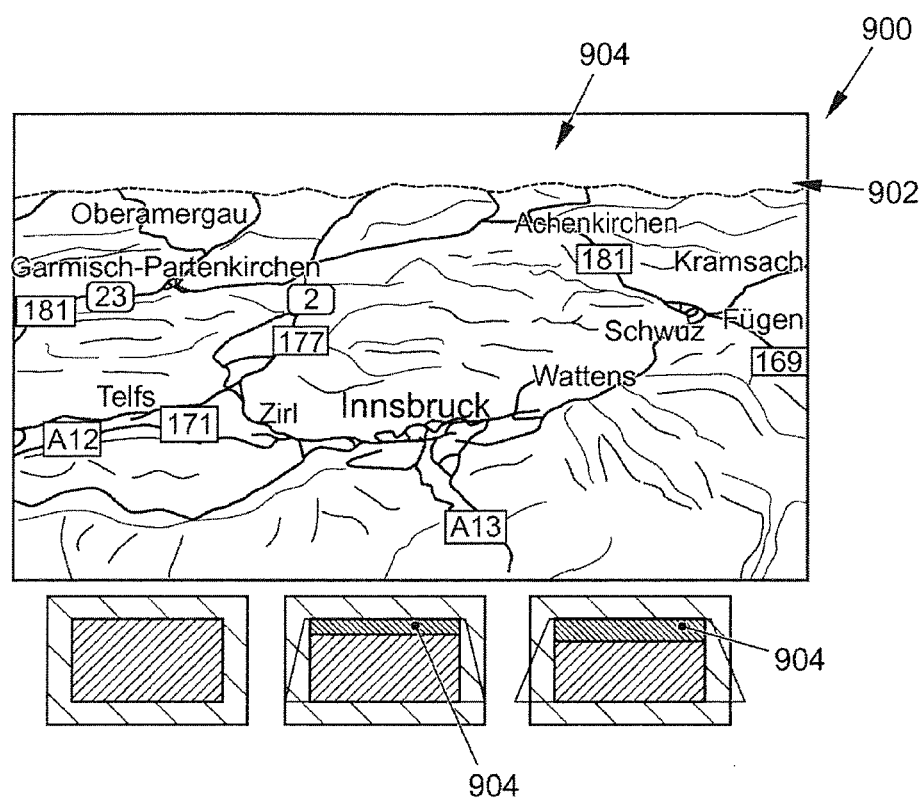
FIG. 9 shows a plastic representation of a map section with a realistic horizon behavior.

FIG. 9 shows a plastic representation of a map section 900 having a horizon behavior with a realistic appearance. The OpenGL rendering engine used to produce the map section 900 is capable of using what is known as a far plane parameter or a clipping plane parameter to define a position for a rear edge 902 of the rendering region and to produce a horizon behavior at that position on the basis of predetermined colors. The mechanisms of the 3D engine can be combined so that the definition of the far plane by means of all the zoom levels and of a color characteristic for the horizon 904 achieves a natural and realistic representation of the horizon 904 that conveys the optical appearance of a curvature of the earth. According to some exemplary embodiments, the processor module 150 is thus designed to provide a horizon region 904 in a region of the digital map detail that becomes free as a result of the coordinate transformation of the original geodata in the case of a viewing direction that corresponds to an observation point behind and above the geographical position. This can be seen particularly in the lower portion of FIG. 9, which shows the original untransformed geodata in a plan view on the left-hand side and various steep lines of vision, i.e. perspectives, in the center and on the right-hand side that result from tilting of the earth's surface defined by the two-dimensional geodata.

In this case, the horizon settings can be parameterized on the basis of the table shown in FIG. 10. Slight deviations, for example by up to 10%, from the values presented in FIG. 10 are possible. The parameters used, besides the zoom level 1002, are "scale factor" 1004 and "sky offset" 1006. The "scale factor" parameter 1004 stipulates a displacement factor relative to the map detail represented on the display. The second parameter, "sky offset", 1006 describes an absolute distance to the beginning of a mist that is represented beneath a horizon line from the beginning of the screen edge.

Figure 11:
FIG. 11 shows a map detail that has been produced through a combined use of colors, road widths, suppressions and shown/hidden features.

FIG. 11 shows a map detail 1100 according to one exemplary embodiment that has been produced through a combined use of colors, road widths, suppressions and shown/hidden features. According to some exemplary embodiments, a combination of colors, road widths, suppressions and shown/hidden features is used such that the viewer is at all times provided with an optimum map representation that contains all the required information, is not overloaded and that guarantees, through the clever application of color contrasts, that all the important elements can always be read and identified in an ideal manner. To produce such a representation, different attributes are used as follows.

Color values for elements like roads and polygons are each indicated as an RGBA value in a manner separated according to inline and outline, e.g. freeways, tunnels, bridges, A-roads, country roads, local roads, pedestrian zones, ferry roads, industrial areas, built-up areas, oceans, lakes, rivers, canals, parks, forests, cemeteries, boundaries, railroad lines, routes, etc. In this case, inline describes an area of a linear object (e.g. road), that is to say the region that lies between the two contour lines. The outline describes the contour line itself.

Visibility for the elements such as roads, polygons and text labels can be defined by means of statements for zoom scales, e.g. freeways, tunnels, bridges, A-roads, country roads, local roads, pedestrian zones, ferry roads, industrial areas, built-up areas, oceans, lakes, rivers, canals, parks, forests, cemeteries, boundaries, railroad lines, routes, one-way street arrows, city names, road names, checkered flags, labels for forests and bodies of water, etc.

Typefaces for text labels can be defined by defining font, font size, font color, thickness and color of the outline, e.g. city names, road names, road numbers, names for bodies of water, forest names, tunnel names, island names, etc.

A suppression algorithm and a character order are executed by stipulating a fixed order for all representable elements. A configuration for the character width for roads and polygons is stipulated in a manner separated according to inline and outline by means of all the zoom levels by defining pixel values, e.g. for freeways, tunnels, bridges, A-roads, country roads, local roads, pedestrian zones, ferry roads, routes, etc.

FIGS. 12a to 12f show various exemplary embodiments according to the attributes described above.

Figure 12A:
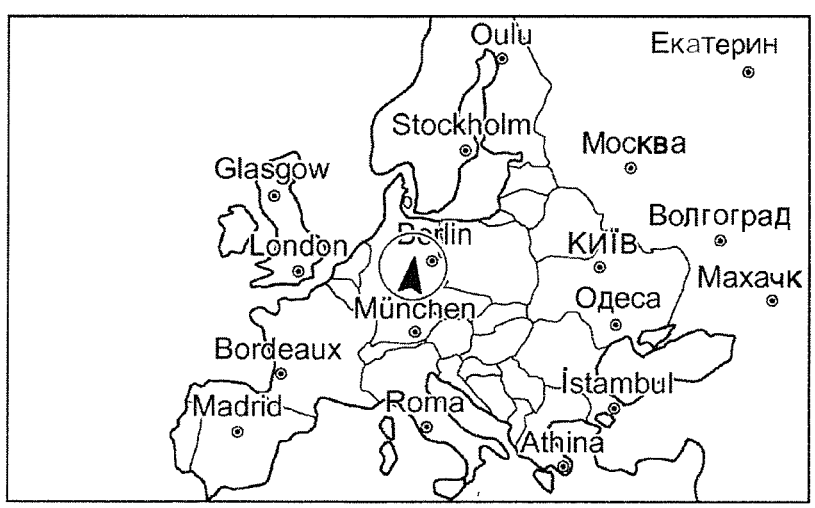
FIGS. 12a-12f show clear navigation maps on all scales through combined use of colors, road widths, suppressions and shown/hidden features.

FIG. 12a shows a map section in a night representation in which bodies of water and city names are represented with a defined typeface, names of smaller cities are suppressed, no roads are displayed, but national boundaries are displayed. That is to say that what is visible is dependent on the selected zoom level. The higher the zoom level, the more details can become visible.

Figure 12B:
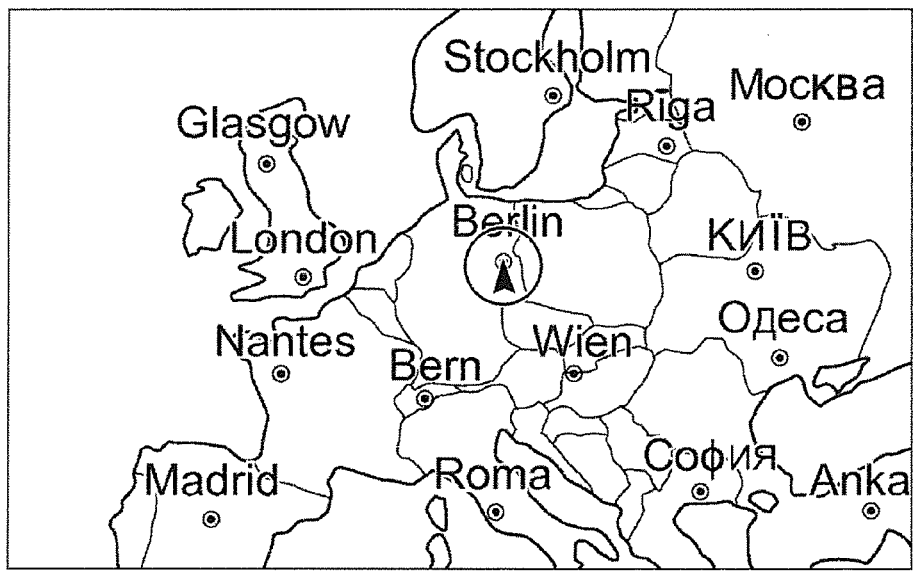

FIG. 12b shows a plan view of the map section shown in FIG. 12a in a day representation. In this case too, bodies of water and city names are represented with a defined typeface, names of smaller cities are suppressed, no roads are displayed but national boundaries are displayed.

Figure 12C:
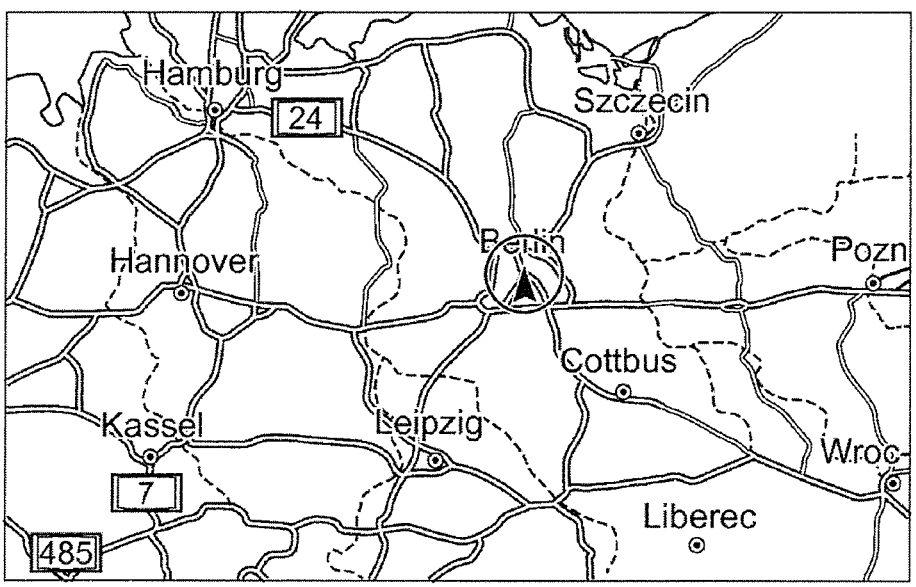

FIG. 12c shows a plan view of a map section in a day representation and at a higher zoom level, in which larger cities are represented with a defined typeface, freeways and connecting roads are displayed in a defined width and color schema for inline and outline, road numbers and boundaries are represented and all other elements are hidden.

Figure 12D:
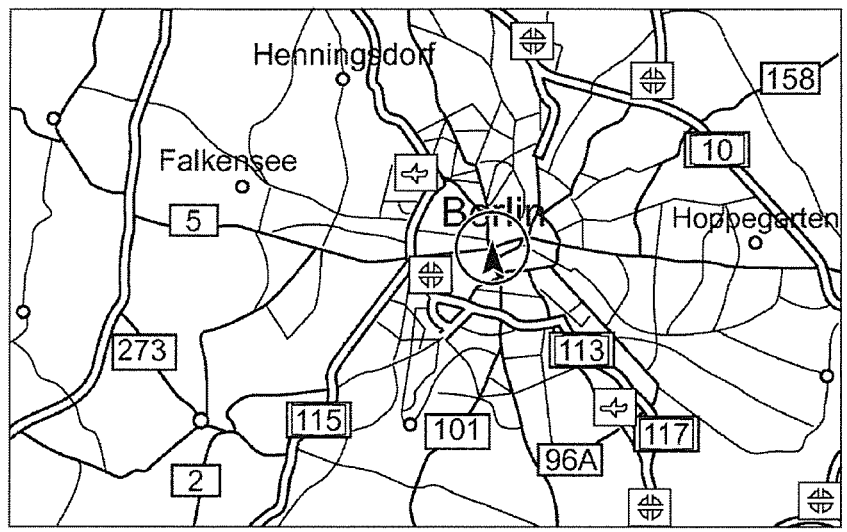

FIG. 12d shows a plan view of a map section with even greater magnification compared to FIG. 12c in a day representation, in which larger and smaller localities are represented with a defined typeface, freeways are displayed, connecting roads and local roads are displayed in a defined width and color schema for inline and outline, built-up areas, forests and bodies of water are represented in a defined color, road numbers and points of interest (PoI) are represented and all other elements are hidden.

Figure 12E:
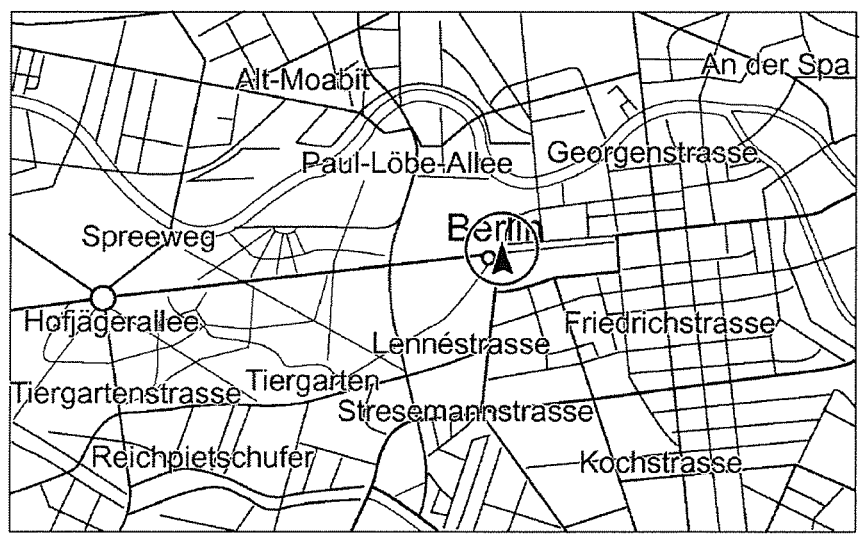

FIG. 12e shows a plan view of a map section in a day representation with even greater magnification, in which smaller localities and road names are represented with a defined typeface, local roads and secondary roads are displayed in a defined width and color scheme for inline and outline, built-up areas, forests and bodies of water are represented in a defined color, road numbers are represented and all other elements are hidden.

Figure 12F:
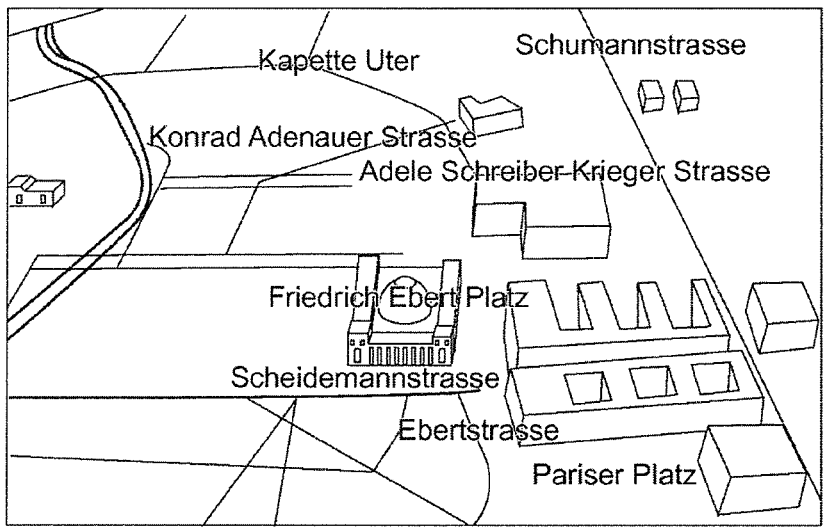

FIG. 12f shows a notionally plastic map section in a night representation, in which road names are represented with a defined typeface, local roads and secondary roads are displayed in a defined width and color schema for inline and outline, built-up areas, forests and bodies of water are represented in a defined color, one-way street arrows are represented according to a defined pattern, textured and untextured 3D buildings are represented and all other elements are hidden.

Figure 13:
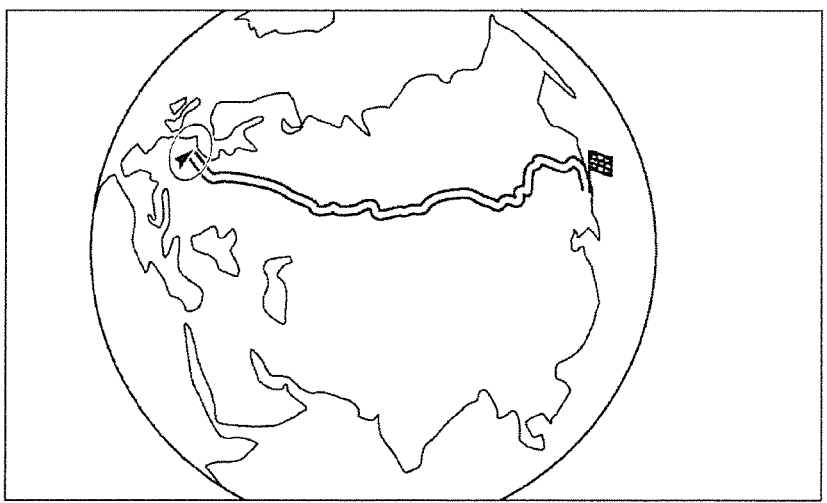
FIG. 13 shows a plastic representation of great distances on the earth's surface.

A further application is for assessment of large scales and routes with a great distance. It is thus possible for routes that extend over large portions of the earth's surface likewise to be represented in plastic form, as shown in FIG. 13. Zooming out a long way allows a large overview. At the same time, exemplary embodiments allow the globe to be rotated to explore the earth. Both a day representation and a night representation or mode are possible.

Figure 14:
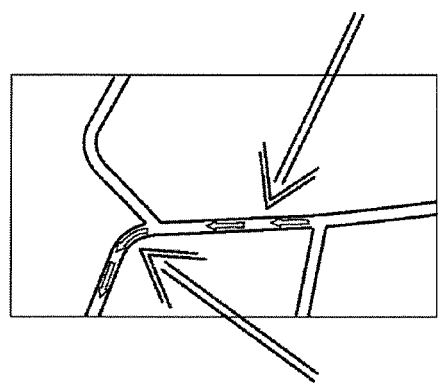
FIG. 14 shows visual highlighting of one-way streets on a map section.

FIG. 14 shows a mechanism for visually highlighting one-way streets on a navigation map by the arrangement of grid tiles.

The features disclosed in the description above, the claims below and the enclosed figures may be of significance for realizing an exemplary embodiment in their various refinements, and can be implemented, either individually or in any combination.

Although some aspects have been described in connection with an apparatus, it goes without saying that these aspects are also a description of the corresponding method, which means that a block or an element of an apparatus can also be understood to be a corresponding method step or to be a feature of a method step. Similarly, aspects that have been described in connection with or as a method step are also a description of a corresponding block or detail or feature of a corresponding apparatus.

According to particular implementation requirements, exemplary embodiments may be implemented in hardware or in software. The implementation can be performed using a digital storage medium, for example a floppy disk, a DVD, a BluRay disk, a CD, a ROM, a PROM, an EPROM, an EEPROM or a FLASH memory, a hard disk or another magnetic or optical memory that stores electronically readable control signals that are able to interact or do interact with a programmable hardware component such that the respective method is performed.

A programmable hardware component may be formed by a processor, a computer processor (CPU=Central Processing Unit), a graphics processor (GPU=Graphics Processing Unit), a computer, a computer system, an application-specific integrated circuit (ASIC) an integrated circuit (IC), a system on chip (SOC), a programmable logic element or a field-programmable gate array (FPGA) with a microprocessor.

The digital storage medium may therefore be machine-readable or computer-readable. Some exemplary embodiments thus comprise a data storage medium that has electronically readable control signals that are capable of interacting with a programmable computer system or a programmable hardware component such that one of the methods described herein is performed. An exemplary embodiment is therefore a data storage medium (or a digital storage medium or computer-readable medium) on which the program for performing one of the methods described herein is recorded.

In general, exemplary embodiments may be implemented as a program, firmware, a computer program or computer program product with a program code or as data, the program code or the data being effective for performing one of the methods when the program runs on a processor or programmable hardware component. The program code or the data may also be stored on a machine-readable storage medium or data storage medium, for example. The program code or the data may be present as a source code, machine code or bytecode and as another intermediate code, inter alia.

A program according to one exemplary embodiment can implement one of the methods whilst being performed, for example by reading memory locations or writing a datum or a plurality of data thereto, which possibly prompts switching processes or other processes in transistor structures, in amplifier structures or in other electrical, optical or magnetic components or components operating on another functional principle. Accordingly, data, values, sensor values or other information can be captured, determined or measured by a program by reading a memory location. A program can therefore capture, determine or measure variables, values, measured variables and other information by reading one or more memory locations, and can prompt, bring about or perform an action and actuate other appliances, machines and components by writing to one or more memory locations.

The exemplary embodiments described above are merely an illustration of the principles. It goes without saying that modifications and variations of the arrangements and details described herein will be apparent for a person that is skilled in the art. The intention is, therefore, for the invention to be limited merely by the scope of protection of the patent claims below rather than by the specific details that have been presented herein on the basis of the description and the explanation of the exemplary embodiments.

The invention claimed is:

1. A navigation apparatus for the spatial representation of a digital map detail around a geographical position on the earth's surface on the basis of digital geodata, wherein the digital geodata have height information, having the following features:
a first input interface for the digital geodata;
a second input interface for coordinates of the geographical position;
a third input interface for a perspective stipulation variable that corresponds to a height above the earth's surface that can be used to set a viewing angle between a desired viewing direction and the earth's surface;
a processor module coupled to the first, second and third input interfaces and customized, on the basis of the perspective stipulation variable and the geographical position, to ascertain a coordinate transformation for the geodata that corresponds to the desired viewing angle and, to associate different visual perception values for the geodata for different topological height values, to obtain a visually differently perceptible projection for the geodata that corresponds to the height information; and
an output interface, coupled with the processor module, for outputting output data that correspond to the visually differently perceptible projection of the geodata that corresponds to the height information.

2. The navigation apparatus of claim 1, wherein the digital geodata have two-dimensional geodata plus associated height values, and wherein the processor module is customized, on the basis of the perspective stipulation variable and the geographical position, to ascertain a two-dimensional coordinate transformation for the two-dimensional geodata that corresponds to the desired viewing angle and to associate different visual perception values with the two-dimensional geodata for different topographical height values.

3. The navigation apparatus of claim 1, wherein the digital geodata are three-dimensional, wherein the navigation apparatus additionally has a fourth input interface for a light source stipulation variable that corresponds to a desired virtual light source, and wherein the processor module is customized, on the basis of the perspective stipulation variable and the geographical position, to ascertain a three-dimensional coordinate transformation for the geodata that corresponds to the desired viewing angle and to associate different visual perception values with the three-dimensional geodata for different topographical height values and to associate different light and shade regions with the three-dimensional projection of the geodata on the basis of the light source stipulation variable.

4. The navigation apparatus of claim 1, wherein the processor module provides, in the case of a viewing angle that corresponds to an observation point behind and above the geographical position, a horizon region in a region of the digital map detail that becomes free as a result of the coordinate transformation of the original geodata.

5. The navigation apparatus of claim 1, wherein the processor module is customized to associate a first digital color code with the digital geodata for a first height value and to associate a second digital color code with the digital geodata for a second height value.

6. The navigation apparatus of claim 5, wherein discrete height values that are adjacent in terms of height differ by up to 1000 units of height, and wherein checksums for the color codes associated with the adjacent height values differ from one another by less than 30% to obtain a fluent color characteristic between adjacent height values.

7. The navigation apparatus of claim 1, wherein the navigation apparatus has an electronic memory area with a lookup table stored therein that stores digital visual perception values that correspond to different height values.

8. The navigation apparatus of claim 7, wherein the lookup table stores color codes that correspond to different height values, for a day representation of the digital map detail using two-dimensional geodata according to

| Height | R | G | B |
|---|---|---|---|
| 50 ± 50 | 187 ± 10% | 206 ± 10% | 176 ± 10% |
| 100 ± 50 | 173 ± 10% | 188 ± 10% | 165 ± 10% |
| 200 ± 100 | 143 ± 10% | 166 ± 10% | 139 ± 10% |
| 500 ± 200 | 97 ± 10% | 124 ± 10% | 100 ± 10% |
| 1000 ± 500 | 77 ± 10% | 95 ± 10% | 80 ± 10% |
| 1500 ± 500 | 62 ± 10% | 75 ± 10% | 70 ± 10% |
| 2000 ± 500 | 54 ± 10% | 58 ± 10% | 58 ± 10% |
| 3000 ± 500 | 88 ± 10% | 87 ± 10% | 69 ± 10% |
| 4000 ± 500 | 127 ± 10% | 126 ± 10% | 99 ± 10% | and/or for a night representation of the digital map detail using two-dimensional geodata according to

| Height | R | G | B |
|---|---|---|---|
| 50 ± 50 | 26 ± 10% | 31 ± 10% | 24 ± 10% |
| 100 ± 50 | 38 ± 10% | 47 ± 10% | 36 ± 10% |
| 200 ± 100 | 57 ± 10% | 67 ± 10% | 56 ± 10% |
| 500 ± 200 | 64 ± 10% | 79 ± 10% | 65 ± 10% |
| 1000 ± 500 | 72 ± 10% | 89 ± 10% | 75 ± 10% |
| 1500 ± 500 | 84 ± 10% | 104 ± 10% | 83 ± 10% |
| 2000 ± 500 | 95 ± 10% | 119 ± 10% | 94 ± 10% |
| 3000 ± 500 | 120 ± 10% | 148 ± 10% | 129 ± 10% |
| 4000 ± 500 | 158 ± 10% | 180 ± 10% | 163 ± 10% | for a day representation of the digital map detail using three-dimensional geodata according to

| Height | R | G | B |
|---|---|---|---|
| −1000 ± 500 | 234 ± 10% | 255 ± 10% | 217 ± 10% |
| −200 ± 100 | 234 ± 10% | 255 ± 10% | 217 ± 10% |
| 0 ± 50 | 209 ± 10% | 229 ± 10% | 197 ± 10% |
| 50 ± 50 | 209 ± 10% | 229 ± 10% | 197 ± 10% |
| 100 ± 50 | 187 ± 10% | 206 ± 10% | 176 ± 10% |
| 200 ± 100 | 187 ± 10% | 206 ± 10% | 176 ± 10% |
| 500 ± 200 | 149 ± 10% | 170 ± 10% | 140 ± 10% |
| 1000 ± 500 | 123 ± 10% | 145 ± 10% | 114 ± 10% |
| 1500 ± 500 | 102 ± 10% | 124 ± 10% | 103 ± 10% |
| 2000 ± 500 | 93 ± 10% | 112 ± 10% | 95 ± 10% |
| 3000 ± 500 | 112 ± 10% | 117 ± 10% | 92 ± 10% |
| 4000 ± 500 | 134 ± 10% | 140 ± 10% | 110 ± 10% |
| 5000 ± 500 | 158 ± 10% | 165 ± 10% | 130 ± 10% |
| 6000 ± 500 | 193 ± 10% | 198 ± 10% | 171 ± 10% |
| 7000 ± 500 | 193 ± 10% | 198 ± 10% | 171 ± 10% |
| 8000 ± 500 | 193 ± 10% | 198 ± 10% | 171 ± 10% | and/or for a night representation of the digital map detail using three-dimensional geodata according to

| Height | R | G | B |
|---|---|---|---|
| −1000 ± 500 | 31 ± 10% | 31 ± 10% | 31 ± 10% |
| −200 ± 100 | 31 ± 10% | 31 ± 10% | 31 ± 10% |
| 0 ± 50 | 38 ± 10% | 47 ± 10% | 36 ± 10% |
| 50 ± 50 | 38 ± 10% | 47 ± 10% | 36 ± 10% |
| 100 ± 50 | 47 ± 10% | 58 ± 10% | 45 ± 10% |

-continued

| Height | R | G | B |
|---|---|---|---|
| 200 ± 100 | 57 ± 10% | 67 ± 10% | 56 ± 10% |
| 500 ± 200 | 64 ± 10% | 79 ± 10% | 65 ± 10% |
| 1000 ± 500 | 72 ± 10% | 89 ± 10% | 75 ± 10% |
| 1500 ± 500 | 84 ± 10% | 104 ± 10% | 83 ± 10% |
| 2000 ± 500 | 95 ± 10% | 119 ± 10% | 94 ± 10% |
| 3000 ± 500 | 120 ± 10% | 148 ± 10% | 129 ± 10% |
| 10 000 ± 5000 | 158 ± 10% | 180 ± 10% | 163 ± 10%. |

9. The navigation apparatus of claim 1, wherein the desired viewer perspective is adjustable by means of an altered perspective stipulation variable.

10. The navigation apparatus of claim 1, wherein the navigation apparatus has, in the electronic memory area, a further lookup table stored therein that stores viewing angles that correspond to different height values according to the following table:

| Height | Viewing angle (°) |
|---|---|
| 30-750 m | 34 ± 10% |
| 1-4 km | 34 ± 10% |
| 6-8 km | 36 ± 10% |
| 10 km | 37 ± 10% |
| 15 km | 38 ± 10% |
| 20-30 km | 39 ± 10% |
| 40 km | 42 ± 10% |
| 50 km | 45 ± 10% |
| 60 km | 48 ± 10% |
| 80 km | 54 ± 10% |
| 100 km | 60 ± 10% |
| 125 km | 63 ± 10% |
| 150 km | 66 ± 10% |
| 175 km | 69 ± 10% |
| 200 km | 72 ± 10% |
| 300 km | 78 ± 10% |
| 400 km | 81 ± 10% |
| 500 km | 84 ± 10% |
| 600 km | 87 ± 10% |
| 1000 km | 90 − 10% |
| 1500 km | 90 − 10% |
| 2000 km | 90 − 10% |
| 2500 km | 90 − 10%. |

11. A vehicle comprising a navigation apparatus for the spatial representation of a digital map detail around a geographical position on the earth's surface on the basis of digital geodata, wherein the navigation apparatus comprises:
a first input interface for the digital geodata;
a second input interface for coordinates of the geographical position;
a third input interface for a perspective stipulation variable that corresponds to a height above the earth's surface that can be used to set a viewing angle between a desired viewing direction and the earth's surface;
a processor module coupled to the first, second and third input interfaces and customized, on the basis of the perspective stipulation variable and the geographical position, to ascertain a coordinate transformation for the geodata that corresponds to the desired viewing angle;
an output interface, coupled with the processor module, for outputting output data that correspond to the visually differently perceptible projection of the geodata; and
wherein the geographical position represents a current vehicle position or a desired vehicle position.

12. A method for the spatial representation of a digital map detail around a geographical position on the earth's surface on the basis of digital geodata, wherein the digital geodata have height information comprises:
reading-in of the digital geodata;
reading-in of the coordinates of the geographical position;
reading-in of a perspective stipulation variable that corresponds to a height above the earth's surface that can be used to set a viewing angle between a desired viewing direction and the earth's surface;
ascertaining, on the basis of the perspective stipulation variable and the geographical position, of a coordinate transformation for the geodata that corresponds to the desired viewing direction;
associating different visual perception values for different topographical height values of the geodata in order to obtain a visually differently perceptible projection of the geodata that corresponds to the height information; and
outputting output data that correspond to the visually differently perceptible projection of the geodata that corresponds to the height information.

13. The method of claim 12, wherein the digital geodata have two-dimensional geodata plus associated height values and, on the basis of the perspective stipulation variable and the geographical position, a two-dimensional coordinate transformation of the two-dimensional geodata that corresponds to the desired viewing direction are ascertained to associate different visual perception values with the two-dimensional geodata for different topographical height values.

14. The method of claim 12, wherein the digital geodata are three-dimensional, a light source stipulation variable that corresponds to a desired virtual light source is read in, on the basis of the perspective stipulation variable and the geographical position a three-dimensional coordinate transformation for the geodata that corresponds to the desired viewing direction is ascertained and, to associate different visual perception values with the three-dimensional geodata for different topographical height values, and to associate different light and shade regions to the three-dimensional projection of the geodata on the basis of the light source stipulation variable.

15. The method of claim 12, wherein a horizon region is provided in a region of the digital map detail that becomes free as a result of the coordinate transformation of the original geodata for a viewing direction that corresponds to an observation point behind and above the geographical position.

16. The method of claim 12, wherein a first digital color code is associated with the digital geodata for a first height value and a second digital color code is associated with the digital geodata for a second height value.

17. The method of claim 16, wherein discrete height values that are adjacent in terms of height differ by up to 1000 units of height, and checksums for the color codes associated with the adjacent height values differ from one another by less than 30%, to obtain a fluent color characteristic between adjacent height values.

18. The method of claim 16, wherein discrete height values that are adjacent in terms of height differ by up to 1000 units of height, and checksums for the color codes associated with the adjacent height values differ from one another by less than 20%, to obtain a fluent color characteristic between adjacent height values.

19. The method of claim 12, wherein an electronic memory area having a lookup table stored therein stores digital visual perception values that correspond to different height values.

20. The method of claim 19, wherein the lookup table stores color codes that correspond to different height values, for a day representation of the digital map detail using two-dimensional geodata according to

| Height | R | G | B |
|---|---|---|---|
| 50 ± 50 | 187 ± 10% | 206 ± 10% | 176 ± 10% |
| 100 ± 50 | 173 ± 10% | 188 ± 10% | 165 ± 10% |
| 200 ± 100 | 143 ± 10% | 166 ± 10% | 139 ± 10% |
| 500 ± 200 | 97 ± 10% | 124 ± 10% | 100 ± 10% |
| 1000 ± 500 | 77 ± 10% | 95 ± 10% | 80 ± 10% |
| 1500 ± 500 | 62 ± 10% | 75 ± 10% | 70 ± 10% |
| 2000 ± 500 | 54 ± 10% | 58 ± 10% | 58 ± 10% |
| 3000 ± 500 | 88 ± 10% | 87 ± 10% | 69 ± 10% |
| 4000 ± 500 | 127 ± 10% | 126 ± 10% | 99 ± 10% | and/or for a night representation of the digital map detail using two-dimensional geodata according to

| Height | R | G | B |
|---|---|---|---|
| 50 ± 50 | 26 ± 10% | 31 ± 10% | 24 ± 10% |
| 100 ± 50 | 38 ± 10% | 47 ± 10% | 36 ± 10% |
| 200 ± 100 | 57 ± 10% | 67 ± 10% | 56 ± 10% |
| 500 ± 200 | 64 ± 10% | 79 ± 10% | 65 ± 10% |
| 1000 ± 500 | 72 ± 10% | 89 ± 10% | 75 ± 10% |
| 1500 ± 500 | 84 ± 10% | 104 ± 10% | 83 ± 10% |
| 2000 ± 500 | 95 ± 10% | 119 ± 10% | 94 ± 10% |
| 3000 ± 500 | 120 ± 10% | 148 ± 10% | 129 ± 10% |
| 4000 ± 500 | 158 ± 10% | 180 ± 10% | 163 ± 10% | for a day representation of the digital map detail using three-dimensional geodata according to

| Height | R | G | B |
|---|---|---|---|
| −1000 ± 500 | 234 ± 10% | 255 ± 10% | 217 ± 10% |
| −200 ± 100 | 234 ± 10% | 255 ± 10% | 217 ± 10% |
| 0 ± 50 | 209 ± 10% | 229 ± 10% | 197 ± 10% |
| 50 ± 50 | 209 ± 10% | 229 ± 10% | 197 ± 10% |
| 100 ± 50 | 187 ± 10% | 206 ± 10% | 176 ± 10% |
| 200 ± 100 | 187 ± 10% | 206 ± 10% | 176 ± 10% |
| 500 ± 200 | 149 ± 10% | 170 ± 10% | 140 ± 10% |
| 1000 ± 500 | 123 ± 10% | 145 ± 10% | 114 ± 10% |
| 1500 ± 500 | 102 ± 10% | 124 ± 10% | 103 ± 10% |
| 2000 ± 500 | 93 ± 10% | 112 ± 10% | 95 ± 10% |
| 3000 ± 500 | 112 ± 10% | 117 ± 10% | 92 ± 10% |
| 4000 ± 500 | 134 ± 10% | 140 ± 10% | 110 ± 10% |
| 5000 ± 500 | 158 ± 10% | 165 ± 10% | 130 ± 10% |
| 6000 ± 500 | 193 ± 10% | 198 ± 10% | 171 ± 10% |
| 7000 ± 500 | 193 ± 10% | 198 ± 10% | 171 ± 10% |
| 8000 ± 500 | 193 ± 10% | 198 ± 10% | 171 ± 10% | and/or for a night representation of the digital map detail using three-dimensional geodata according to

| Height | R | G | B |
|---|---|---|---|
| −1000 ± 500 | 31 ± 10% | 31 ± 10% | 31 ± 10% |
| −200 ± 100 | 31 ± 10% | 31 ± 10% | 31 ± 10% |
| 0 ± 50 | 38 ± 10% | 47 ± 10% | 36 ± 10% |
| 50 ± 50 | 38 ± 10% | 47 ± 10% | 36 ± 10% |
| 100 ± 50 | 47 ± 10% | 58 ± 10% | 45 ± 10% |
| 200 ± 100 | 57 ± 10% | 67 ± 10% | 56 ± 10% |
| 500 ± 200 | 64 ± 10% | 79 ± 10% | 65 ± 10% |
| 1000 ± 500 | 72 ± 10% | 89 ± 10% | 75 ± 10% |
| 1500 ± 500 | 84 ± 10% | 104 ± 10% | 83 ± 10% |
| 2000 ± 500 | 95 ± 10% | 119 ± 10% | 94 ± 10% |
| 3000 ± 500 | 120 ± 10% | 148 ± 10% | 129 ± 10% |
| 10 000 ± 5000 | 158 ± 10% | 180 ± 10% | 163 ± 10%. |

21. The method of 12, wherein the desired viewer perspective is adjusted by an altered perspective stipulation variable.

22. The method of claim 21, wherein the electronic memory area stores a further lookup table stored therein that stores viewing angles that correspond to different height values according to the following table:

| Height | Viewing angle (°) |
|---|---|
| 30-750 m | 34 ± 10% |
| 1-4 km | 34 ± 10% |
| 6-8 km | 36 ± 10% |
| 10 km | 37 ± 10% |
| 15 km | 38 ± 10% |
| 20-30 km | 39 ± 10% |
| 40 km | 42 ± 10% |
| 50 km | 45 ± 10% |
| 60 km | 48 ± 10% |
| 80 km | 54 ± 10% |
| 100 km | 60 ± 10% |
| 125 km | 63 ± 10% |
| 150 km | 66 ± 10% |
| 175 km | 69 ± 10% |
| 200 km | 72 ± 10% |
| 300 km | 78 ± 10% |
| 400 km | 81 ± 10% |
| 500 km | 84 ± 10% |
| 600 km | 87 ± 10% |
| 1000 km | 90 − 10% |
| 1500 km | 90 − 10% |
| 2000 km | 90 − 10% |
| 2500 km | 90 − 10%. |

23. A computer program having a programming code for performing the method of claim 12 when the computer program is executed on a programmable hardware component.

* * * * *